United States Patent
Iwato et al.

(10) Patent No.: US 7,961,282 B2
(45) Date of Patent: Jun. 14, 2011

(54) LIQUID CRYSTAL DISPLAY DEVICE HAVING CONDUCTIVE LAYERS IN A GROOVE PORTION BETWEEN A SEALING REGION AND A DISPLAY REGION

(75) Inventors: Hiroaki Iwato, Mobara (JP); Katsumi Ichihara, Mutsuzawa (JP); Masafumi Hirata, Ooamishirasato (JP); Nagatoshi Kurahashi, Ooamishirasato (JP)

(73) Assignees: Hitachi Displays, Ltd., Chiba-ken (JP); Panasonic Liquid Crystal Display Co., Ltd., Hyogo (JP)

( * ) Notice: Subject to any disclaimer, the term of this patent is extended or adjusted under 35 U.S.C. 154(b) by 237 days.

(21) Appl. No.: 11/822,516

(22) Filed: Jul. 6, 2007

(65) Prior Publication Data
US 2008/0018848 A1   Jan. 24, 2008

(30) Foreign Application Priority Data
Jul. 18, 2006  (JP) .................................. 2006-195104

(51) Int. Cl.
   *G02F 1/1337* (2006.01)
   *G02F 1/1341* (2006.01)
(52) U.S. Cl. ........................................ 349/123; 349/189
(58) Field of Classification Search .................. 349/123, 349/124, 153, 189, 190
See application file for complete search history.

(56) References Cited

U.S. PATENT DOCUMENTS

| | | | | |
|---|---|---|---|---|
| 2002/0075439 A1* | 6/2002 | Uehara | | 349/149 |
| 2004/0150776 A1* | 8/2004 | Kim | | 349/138 |
| 2004/0185301 A1* | 9/2004 | Tsuchiya et al. | | 428/690 |
| 2004/0263740 A1* | 12/2004 | Sakakura et al. | | 349/138 |
| 2005/0225692 A1* | 10/2005 | Yanagawa et al. | | 349/44 |
| 2005/0280768 A1* | 12/2005 | Koo | | 349/190 |
| 2006/0158595 A1* | 7/2006 | Hiroya et al. | | 349/123 |
| 2007/0064165 A1* | 3/2007 | Lee et al. | | 349/40 |
| 2007/0091247 A1* | 4/2007 | Onda | | 349/153 |

FOREIGN PATENT DOCUMENTS

JP   2001-337316   5/2000

* cited by examiner

*Primary Examiner* — Mark A Robinson
*Assistant Examiner* — Paul C Lee
(74) *Attorney, Agent, or Firm* — Stites & Harbison PLLC; Juan Carlos A. Marquez, Esq.

(57) ABSTRACT

An LCD device has a pair of substrates including orientation films on surfaces thereof which face opposing substrates. The substrate on which signal lines are formed, on a side thereof which is disposed between a region on which sealing material is arranged and a display region and along which the signal lines extend to the outside of the sealing material from the display region, includes a first conductive layer, a second conductive layer and an insulation layer which is interposed therebetween. The insulation layer extends in the direction at least along an outer periphery of the display region, and includes groove portion having a recessed groove which opens on the orientation film side. The first conductive layer is covered on the surface of the recessed groove. The signal lines are formed in a state that the signal lines go around the recessed groove.

12 Claims, 22 Drawing Sheets

LIQUID CRYSTAL DISPLAY DEVICE HAVING CONDUCTIVE LAYERS IN A GROOVE PORTION BETWEEN A SEALING REGION AND A DISPLAY REGION

The present application claims priority from Japanese application JP2006-195104 filed on Jul. 18, 2006, the content of which is hereby incorporated by reference into this application.

BACKGROUND OF THE INVENTION

1. Field of the Invention

The present invention relates to a liquid crystal display device, and more particularly to a technique suitable for a control of an outer periphery of an orientation film material in applying an orientation film to an inner surface of a substrate of a liquid crystal display panel which constitutes a liquid crystal display device.

2. Description of the Related Art

As a television device or a display device of an information terminal, a liquid crystal display device which uses a liquid crystal display panel sealing a liquid crystal material between a pair of substrates consisting of a first substrate and a second substrate has been widely spreading. Usually, the liquid crystal display panel which constitutes this type of liquid crystal display device includes, on a main surface (inner surface) of one substrate out of a pair of substrates, a plurality of scanning signal lines and a plurality of video signal lines which intersects the plurality of scanning signal lines in an insulating manner. Then, one pixel is formed in a region which is surrounded by two neighboring scanning signal lines and two neighboring video signal lines, wherein a switching element which performs an ON/OFF control for every pixel, a pixel electrode and the like are formed in one pixel. In general, a thin film transistor (TFT) is used as the switching element. Accordingly, one substrate on which the thin film transistors are formed is referred to as a thin-film-transistor substrate (TFT substrate). Further, another substrate which forms a pair with one substrate on which the thin film transistors are formed is referred to as a counter substrate. Still further, when a plurality of color filters which are formed corresponding pixels formed on the TFT substrate are formed on the counter substrate, such a counter substrate is referred to as the color filter substrate (CF substrate).

As the liquid crystal display panel, there have been known a vertical-electric-field-type liquid crystal display panel such as a TN-type liquid crystal display panel or a VA-type liquid crystal display panel and a lateral-electric-field-type liquid crystal display panel which is known as an IPS-type liquid crystal display panel due to the difference in a driving method of pixels. In the vertical-electric-field-type liquid crystal display panel, a counter electrode (also referred to as a common electrode) which faces the pixel electrode of the TFT substrate is arranged on a counter substrate side. Further, in case of the lateral-electric-field-type liquid crystal display panel, the counter electrode is formed on the TFT substrate side on which the pixel electrodes are formed, for example.

The TFT substrate and the counter substrate respectively have an orientation film having a function of controlling the direction (initial orientation) of liquid crystal molecules in a state that no potential difference exists between the pixel electrode and the counter electrode and an arrangement and an inclination of the liquid crystal molecules when the potential difference is generated between the pixel electrode and the counter electrode (liquid crystal orientation control function).

The orientation film is formed on interface between respective main surfaces of the TFT substrate and the counter substrate and a liquid crystal material (a liquid crystal layer) and, an orientation control function is imparted to the orientation film by applying rubbing treatment or polarized light radiation or the like to a surface of a resin film which is formed to cover the whole display region on which pixels are arranged two-dimensionally and is preferably made of polyimide.

The resin film made of polyimide or the like which is formed as the orientation film on the surfaces of respective substrates consisting of the TFT substrate and the counter substrate is formed using a method which is referred to as a aniline printing method. However, recently, there has been proposed a method which forms the orientation film using an inkjet printing method (patent document 1). The ink jet printing method directly applies ink to be formed into the orientation material (orientation film material ink) to the substrate using an ink jet nozzle. The ink jet printing method is an on-contact process and hence, the method has various advantages such as the low contamination of substrate surfaces or the fabrication facility, the reduction of solvent consumption quantity, shortening of process time or the like.

Patent document 1: JP-A-2001-337316

SUMMARY OF THE INVENTION

However, in forming the orientation film using the ink jet printing method, it has been pointed out that it is difficult to restrict a position of a periphery of an ink applied region. That is, the viscosity of orientation-film-material ink used in the ink jet printing method is low compared to the viscosity of a material used in the aniline printing method and hence, when the material of the resin film which forms the orientation film by the ink jet method is applied to the substrate, it is difficult to control the position of the outer periphery of the applied region formed along with spreading by wetting of the orientation material ink which is discharged to the substrate from a nozzle of an ink jet device.

Accordingly, for example, in forming the orientation film on a main surface of a TFT substrate on which, for example, scanning signal lines (also referred to as gate lines), video signal lines (also referred to as data lines or drain lines), TFTs, pixel electrodes and the like are formed by the ink jet printing method, there may be a case that an applied orientation film material spreads by wetting on the main surface and reaches a sealing agent applied region (sealing region) which seals a counter substrate. The orientation film reaches the sealing region, the adhesiveness of the sealing agent and the TFT substrate becomes insufficient attributed to the presence of the orientation film material below the sealing agent and the substrate. This insufficient adhesiveness gives rise to the defective sealing, the positional displacement with the counter substrate or leaking of a liquid crystal material.

In forming the orientation film using the inkjet printing method, to prevent the printed orientation film material ink from spreading by wetting to the sealing region, it may be possible to provide a method which preliminarily decreases a region on which the orientation film material is printed by taking a spreading-by-wetting quantity of the printed orientation material ink into consideration. However, this method results in narrowing an effective display region and, is liable to generate irregularities in a film thickness of the orientation film printed in the inside of the display region.

Besides such a method, it may be also possible to provide a method which suppresses spreading by wetting of the orientation film material ink to be printed by increasing the viscosity of the orientation material ink. However, this method is liable to easily form a region where the orientation film material ink is not applied due to an injection failure (clogging of a nozzle) at the time of printing.

It is an object of the present invention to provide a liquid crystal display device having the structure which, for example, in forming an orientation film in a manufacturing process of a liquid crystal display panel, can suppress undesired spreading by wetting of an orientation film material in an outer peripheral portion of a display region and, at the same time, can maintain the uniformity of a film thickness of the orientation film within the display region.

To explain the summary of the typical constitution of the present invention for achieving the above-mentioned object, the constitution is as follows. That is, a liquid crystal display device includes a display panel in which an annular sealing material is arranged between a pair of substrates, a liquid crystal material is sealed in a space surrounded by the pair of substrates and the sealing material, a display region is formed in the inside of a region surrounded by the sealing material in a plan view, and signal lines which extend to the outside of the sealing material from the inside of the display region are formed on one of the substrates, wherein the pair of substrates have orientation films on surfaces thereof which face opposing substrates, out of the pair of substrates, the substrate on which the signal lines are formed, on a side thereof which is disposed between a region on which the sealing material is arranged and the display region and along which the signal lines extend to the outside of the sealing material from the display region, includes a first conductive layer, a second conductive layer and an insulation layer which is interposed between the first and second conductive layers between the orientation film and the substrate, the insulation layer extends in the direction at least to an outer periphery of the display region, and includes groove portion having a recessed groove which opens on the orientation film side, the first conductive layer is formed along a shape of the recessed groove, and the signal lines are formed in a state that the signal lines go around the recessed groove.

Here, various modifications are conceivable without departing from the technical concept of the present invention described in claims.

The surface of the region in the extending direction of the signal lines (particularly, the scanning signal lines) formed on the substrate, that is, in the direction for pulling out the signal line to a drive circuit from the display region has small irregularities. By forming the recessed groove in such a portion, it is possible to prevent spreading by wetting of the orientation film material ink.

DESCRIPTION OF THE PREFERRED EMBODIMENT

Hereinafter, best modes for carrying out the invention are explained in detail in conjunction with embodiments by reference to drawings. Here, in drawings of respective embodiments explained herein after, parts having identical functions are given the same symbols and their repeated explanation is omitted.

Embodiment 1

Figure 1:
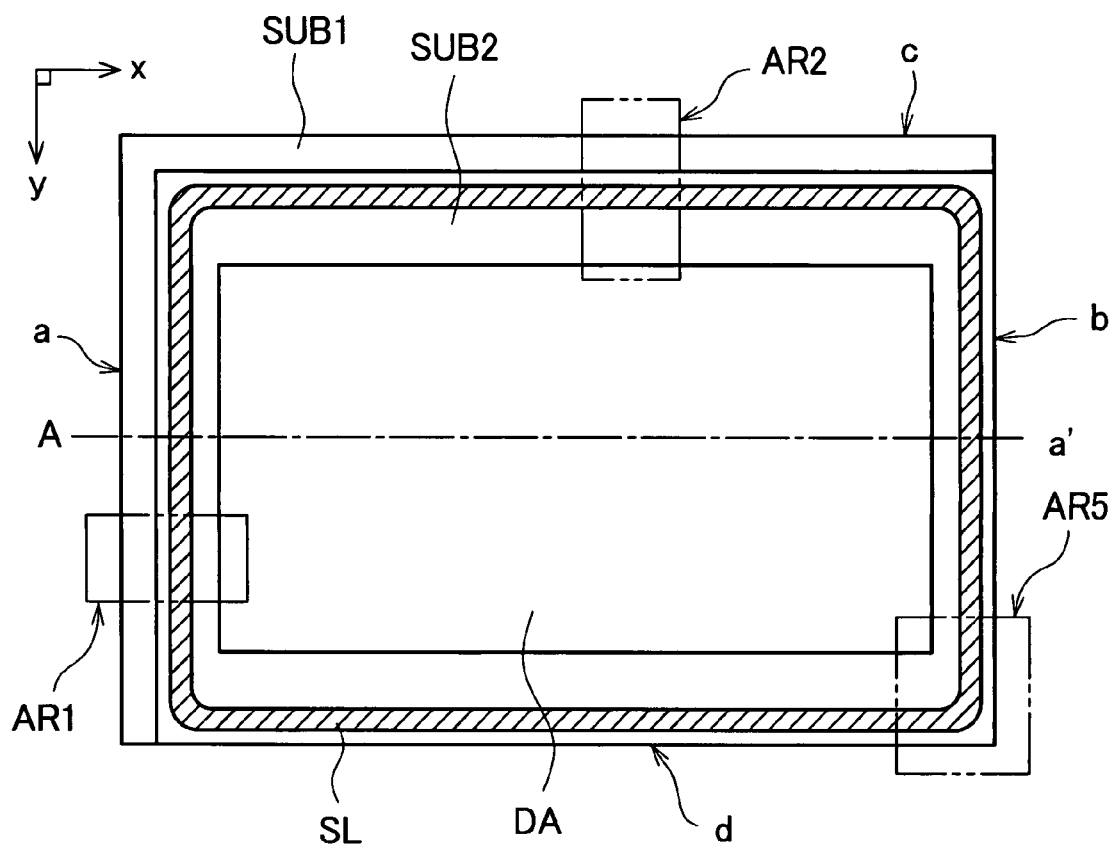
FIG. 1 is a schematic plan view showing the schematic constitution of a liquid crystal display panel of an embodiment 1 according to the present invention.
Figure 2:
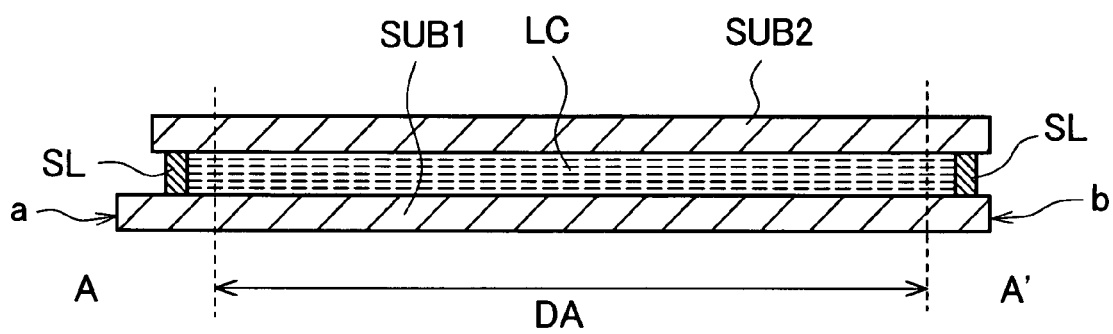
FIG. 2 is a cross-sectional view taken along a line A-A' in FIG. 1.

FIG. 1 is a schematic plan view showing the schematic constitution of a liquid crystal display panel of an embodiment 1 according to the present invention. Further, FIG. 2 is a cross-sectional view taken along a line A-A' in FIG. 1. The liquid crystal display device of the embodiment 1 is constituted of the liquid crystal display panel which includes a first substrate SUB1 which forms one of substrates which are adhered to each other, a second substrate SUB2 which forms another substrate, a sealing region SL which is arranged annularly along a periphery of a gap defined between opposing surfaces of the first substrate SUB1 and the second substrate SUB2, and a liquid crystal layer which is sealed in a space surrounded by the first substrate, and the second substrate and the sealing region, wherein a display region DA is formed inside the sealing region. The display region DA for displaying a video or an image is formed in a region where the first substrates SUB1, the second substrate SUB2 and the liquid crystal layer LC overlap each other in a plan view.

Further, in this embodiment, the first substrate SUB1 and the second substrate SUB2 differ from each other in a profile size in a plan view. When the liquid crystal display device is a relatively large-sized display device such as a television receiver set or a display for a personal computer, the first substrate SUB1 and the second substrate SUB2 overlap each other along one side out of two sides (long sides) parallel to the x direction in FIG. 1 and along one side out of two sides (short sides) parallel to the y direction in FIG. 1 in a plan view.

Further, the first substrate SUB1 which is a larger substrate out of a pair of substrates is also referred to as a thin film transistor (TFT substrate). Although not shown in the drawing, on the thin film transistor substrate, for example, a plurality of scanning signal lines (gate lines) which extends in the x direction in FIG. 1 and a plurality of video signal lines (data lines) which extends in the y direction in FIG. 1 are formed. Further, in the TFT substrate SUB1, a region surrounded by two neighboring scanning signal lines and two neighboring video signal lines constitutes a pixel region in which one pixel is formed and a TFT and a pixel electrode are arranged in each pixel region.

Further, the second substrate SUB2 which is a smaller substrate out of the pair of substrates is also referred to as a counter substrate. When the liquid crystal display panel is a RGB color liquid crystal display panel, one color pixel is constituted of three sub pixels and, on the counter substrate 2, a red (R) color filter, a green (G) color filter and a blue (B) color filter are arranged for respective sub pixels.

Further, when the liquid crystal display panel adopts a driving method which is referred to as a vertical electric field method such as a TN method or a VA method, for example, a counter electrode (also referred to as a common electrode) which faces the pixel electrodes of the TFT substrate SUB1 in an opposed manner is formed on the counter-substrate-SUB2 side. Further, when the liquid crystal display panel adopts a driving method which is referred to as a lateral electric field method such as an IPS method, for example, the counter electrodes are formed on the TFT-substrate-SUB1 side.

Further, out of two short sides a, b of the TFT substrate SUB1 which are arranged in parallel to the y direction, the short side a which does not overlap a side of the counter substrate SUB2 is a side to which, for example, a driver IC (scanning signal line drive circuit chip) for inputting scanning signals to respective scanning signal lines, or a COF or a TCP on which the driver IC is mounted is connected. Further, respective scanning signal lines are connected to gates of the TFT which are arranged in respective pixel regions. Accordingly, in the following explanation, the short side a to which the driver IC for inputting the scanning signals, the COF or the TCP on which the driver IC is mounted or the like is connected is referred to as a gate side and another short side b which is parallel to the gate side is referred to as an opposite gate side.

Further, out of two long sides c, d of the TFT substrate SUB1 which are parallel to the x direction, the long side c which does not overlap a side of the counter substrate SUB2 is a side to which, for example, a driver IC for inputting video signals (also referred to as grayscale signals) to respective video signal lines (data lines or drain lines), a COF or a TCP on which the driver IC is mounted or the like is connected. Further, respective video signal lines are connected to drains of the TFT which are arranged in respective pixel regions. Accordingly, in the following explanation, the long side c to which the driver IC for inputting the video signals, the COF or the TCP on which the driver IC is mounted or the like is connected is referred to as a drain side and another long side d which is parallel to the drain side is referred to as an opposite drain side. Here, as other constitution, a space may be formed on both sides of the first substrate SUB1 in the x direction and a scanning signal line drive circuit chip may be mounted on both short sides or a space may be also formed on both sides of the first substrate SUB1 in the y direction and a video signal line drive circuit chip may be mounted on the respective long sides.

Figure 3:
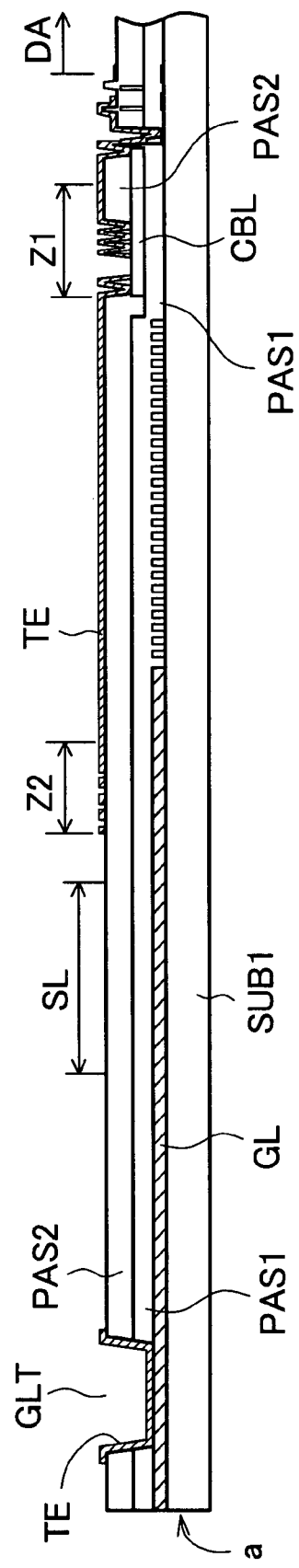
FIG. 3 is a cross-sectional view showing a schematic structural example of a region AR1 on a gate side in FIG. 1.
Figure 4:
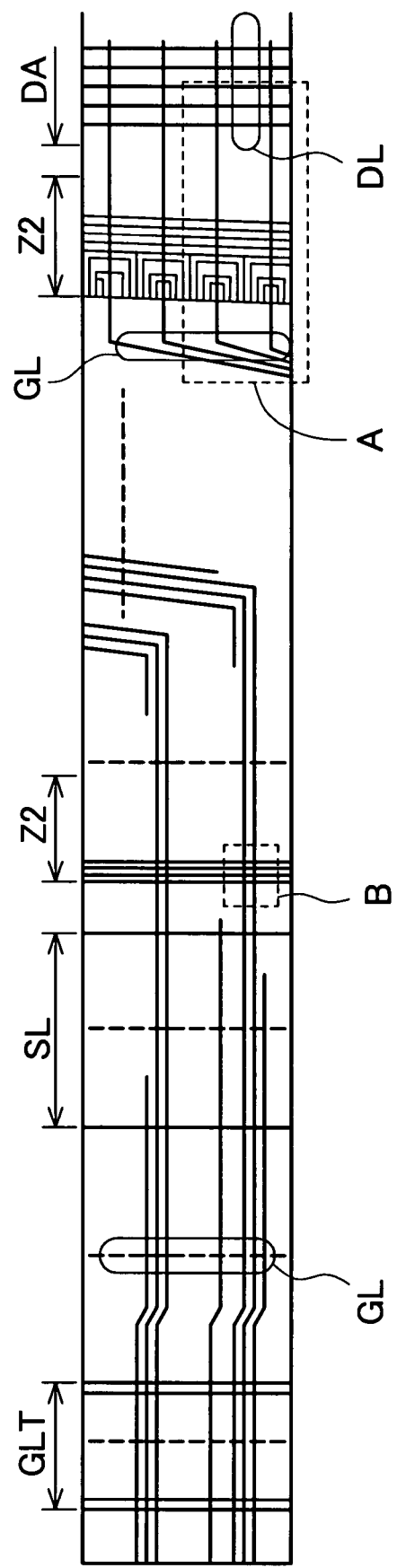
FIG. 4 is a plan view as viewed from above in FIG. 3 showing the schematic structural example of the region AR1 in the gate side in FIG. 1.

FIG. 3 is a cross-sectional view showing a schematic structural example of a region AR1 on a gate side in FIG. 1. Further, FIG. 4 is a plan view as viewed from above in FIG. 3 showing the schematic structural example of the region AR1 on the gate side in FIG. 1. In FIG. 3 and FIG. 4, scanning signal lines GR are formed on a main surface of the TFT substrate SUB1. The scanning signal lines GL are formed of oblique lines on a display region side. A first insulation layer PAS1 is formed on the scanning signal lines GL, and a second insulation layer PAS2 is formed on the first insulation layer PAS1.

On an end portion of a gate side a of the TFT substrate SUB1, an opening which is formed in the first insulation layer PAS1 and the second insulation layer PAS2 and a scanning line terminal GLT which is arranged in the vicinity of a periphery of the opening and forms a transparent conductive film TE thereon are formed. Further, a region indicated by symbol DA is a display region, and a first orientation film outer periphery restricting portion Z1 is arranged in an outer peripheral portion close to the display region DA. Below the first orientation film outer periphery restricting portion Z1, a common bus line CBL which is formed between the first insulation layer PAS1 and the second insulation layer PAS2 is arranged, a recessed groove formed in the second insulation layer PAS2 is covered with a transparent conductive film TE which is preferably made of ITO, and the transparent conductive film TE is connected with the common bus line CBL which constitutes a conductive layer on a bottom portion of the recessed groove.

Symbol SL indicates a sealing region. A second orientation film outer periphery restricting portion Z2 is formed inside the sealing region SL at a position away from the first orientation film outer periphery restricting portion Z1 in the scanning line terminal GLT direction. The second orientation film outer periphery restricting portion Z2 is formed of one or a plurality of slits ST which is formed by linearly removing the transparent conductive film TE which is formed on the second insulation layer PAS2. Here, the transparent conductive film TE is terminated at the second orientation film outer periphery restricting portion Z2 and does not reach the sealing region SL.

Figure 5:
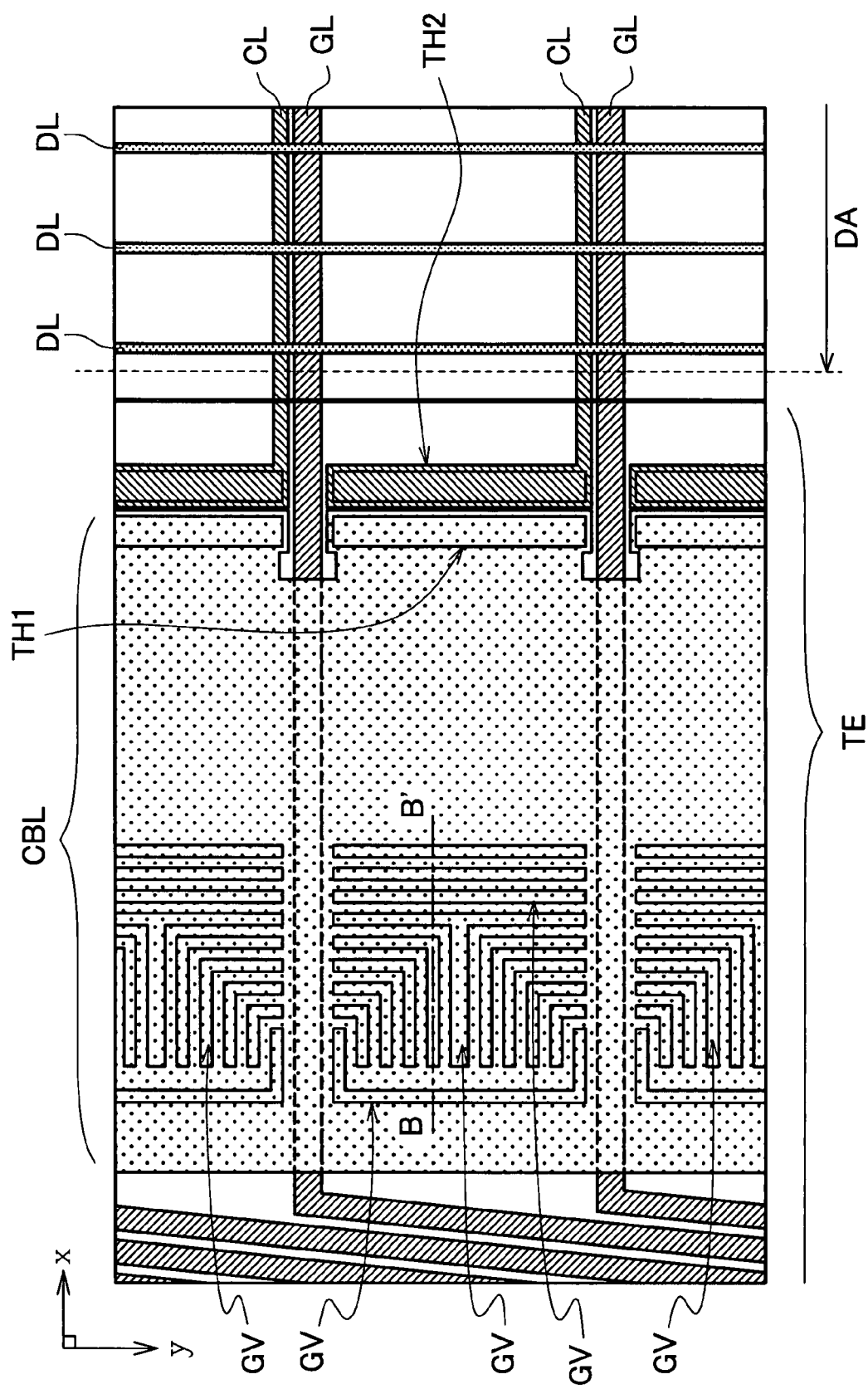
FIG. 5 is a schematic plan view showing a vicinity of a first orientation film outer periphery restricting portion in an enlarged manner.
Figure 6:
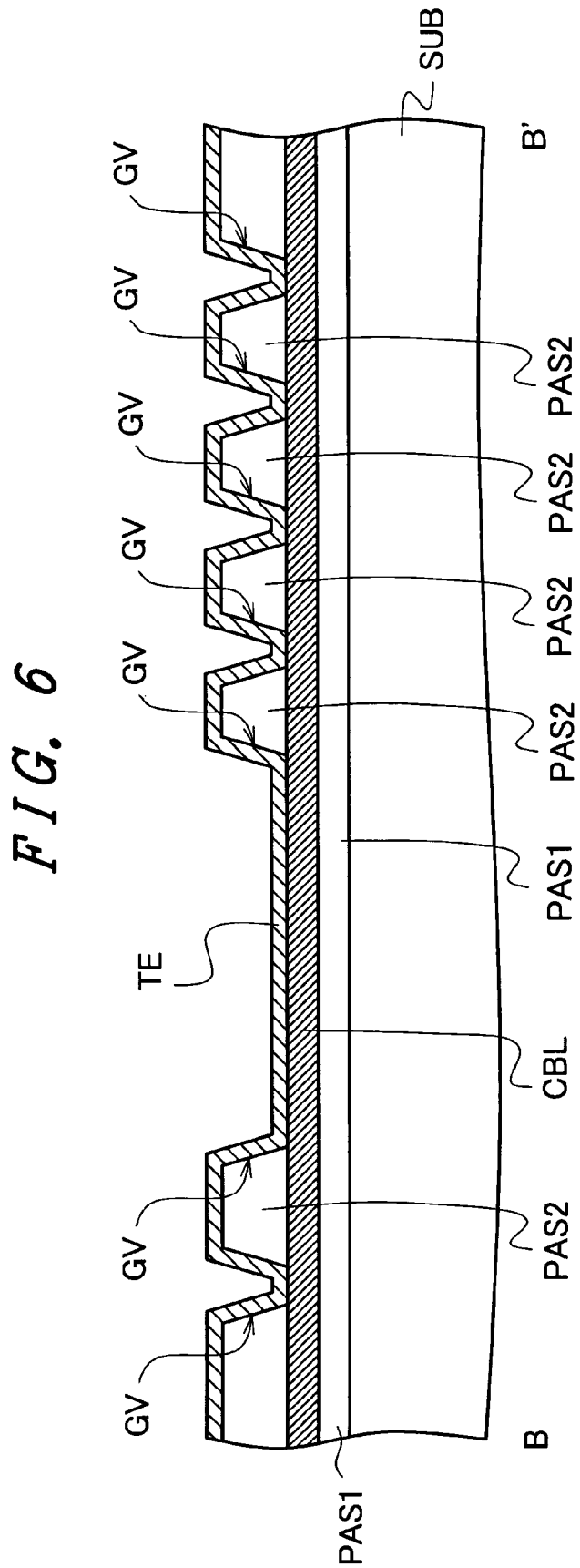
FIG. 6 is a cross-sectional view taken along a line B-B' in FIG. 5.

FIG. 5 is a schematic plan view showing a vicinity of the first orientation film outer periphery restricting portion in an enlarged manner. FIG. 6 is a cross-sectional view taken along a line B-B' in FIG. 5. In the liquid crystal display panel of this embodiment, in the vicinity of an outer periphery of the display region arranged close to the gate side a of the TFT substrate SUB1, outside the display region DA in which the pixel regions each of which is surrounded by two neighboring scanning signal lines GL and two neighboring video signal lines DL are two-dimensionally arranged, for example, a common bus line CBL which is simultaneously formed with the video signal lines DL is formed. The common bus line CBL is formed on a surface of the TFT substrate SUB1 by way of a first insulation layer PAS1. Here, the first insulation layer PAS1 is an insulation layer which is interposed between the scanning signal lines GL and the video signal lines DL in the display region DA, and the first insulation layer PAS1 is interposed between the common bus line CBL and the scanning signal line GL in a region where the common bus line CBL and the scanning signal lines GL intersect each other.

Further, on the common bus line CBL, a second insulation layer PAS2 and the transparent conductive film TE are formed. Here, through holes TH1 shown in FIG. 5, for example, are formed in the second insulation layer PAS2, and the transparent electrode TE is electrically connected with the common bus line CBL which constitutes a conductive layer via the through holes TH1. Further, the transparent conductive film TE is electrically connected to common signal lines CL, holding capacitance lines or the like which are arranged parallel to the scanning signal lines GL via through holes TH2. Further, the transparent conductive film TE is made of a transparent electrode material in the same manner as the pixel electrodes formed in the pixel regions, wherein the transparent electrode TE is preferably made of ITO.

Further, in the liquid crystal display panel of this embodiment, in the TFT substrate SUB1, as shown in FIG. 5 and FIG. 6, apart from the through holes TH1, TH2, recessed grooves GV are formed in the second insulation layer PAS2 formed on the common bus line CBL. The recessed grooves GV are covered with the transparent conductive film TE, and a first orientation film outer periphery restricting portion Z1 is constituted of these recessed grooves GV and the transparent conductive film TE. Here, the recessed grooves GV which constitute the first orientation film outer periphery restricting portion Z1 are, as shown in FIG. 5, constituted of a combination of elongated grooves which extend in the direction (y direction) along the outer periphery of the display region DA, grooves which are bent in the x direction orthogonal to the y direction and grooves which are bifurcated. Further, the recessed grooves GV form a pattern of grooves formed between two neighboring scanning signal lines GL as a unit, and each pattern is formed for every space defined between two neighboring scanning signal lines GL.

Figure 7:
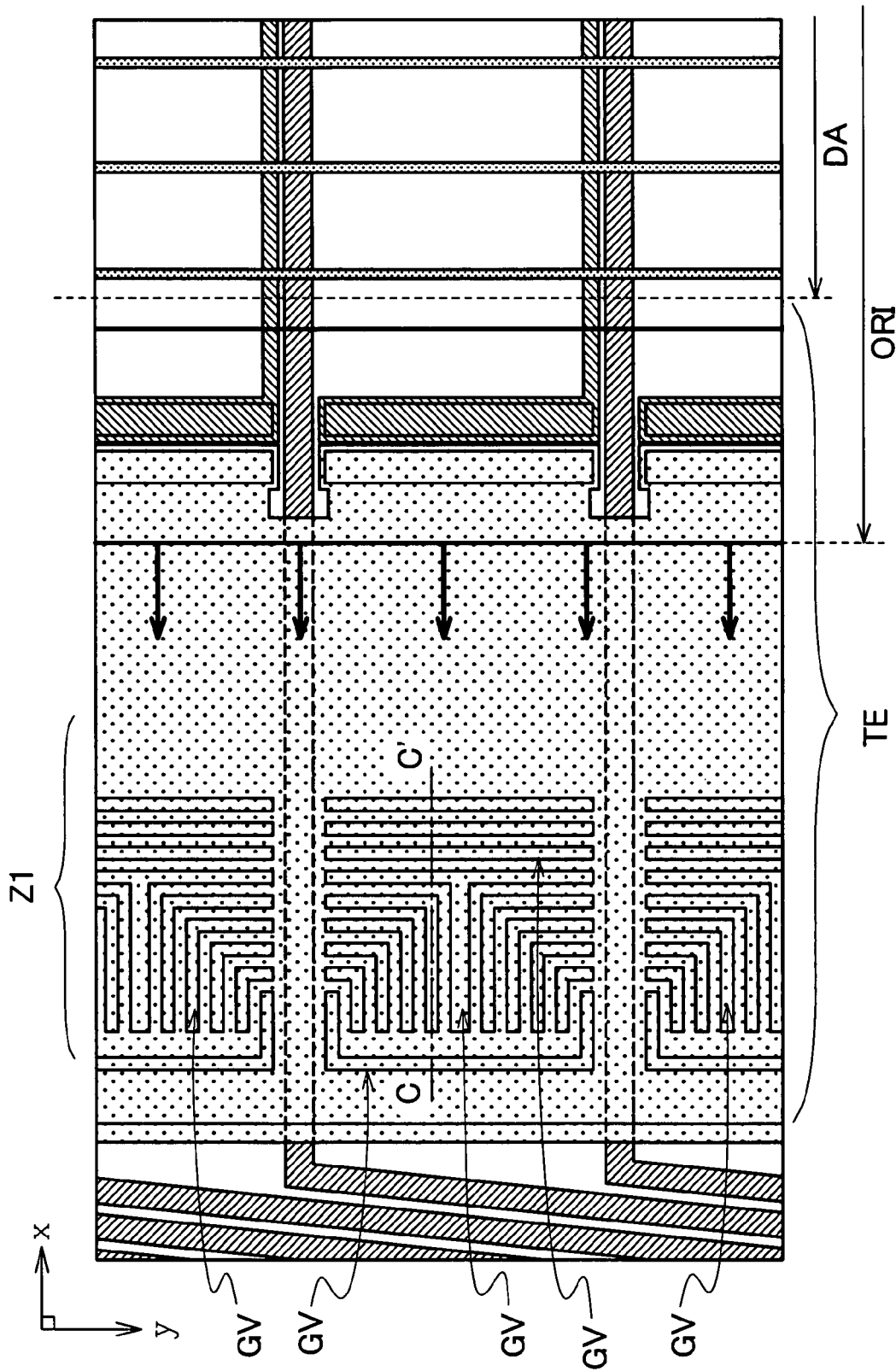
FIG. 7 is a view for explaining spreading of the orientation film material ink when such a material ink is applied.
Figure 8:
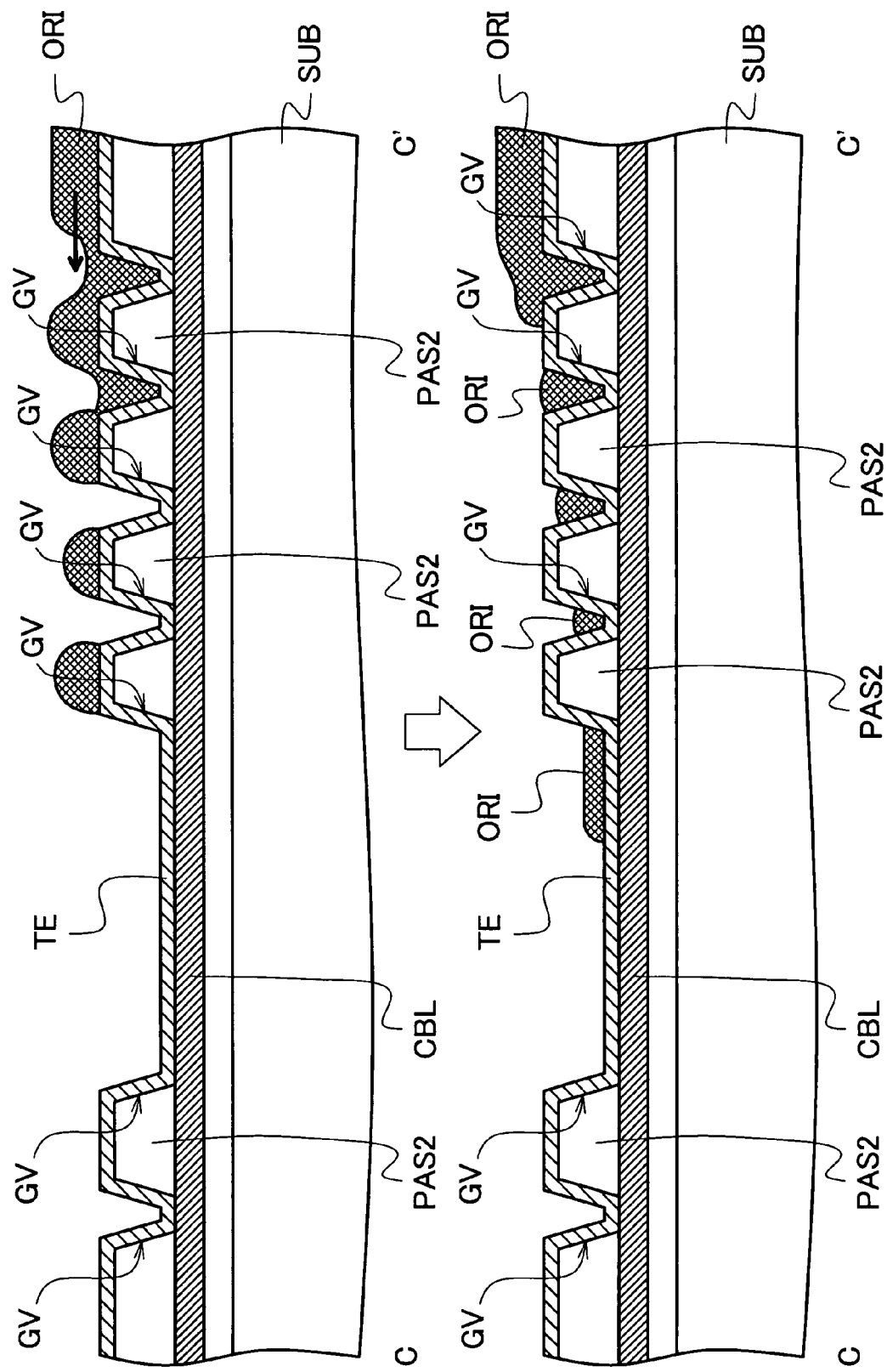
FIG. 8 is a schematic cross-sectional view taken along a line C-C' in FIG. 7.

FIG. 7 and FIG. 8 are schematic views similar to FIG. 5 and FIG. 6 for explaining a function of the first orientation film outer periphery restricting portion in this embodiment. FIG. 7 is a view for explaining spreading of the orientation film material ink when such a material ink is applied. FIG. 8 is a schematic cross-sectional view taken along a line C-C' in FIG. 7. Here, FIG. 7 is a plan view showing a portion of the first orientation film outer periphery restricting portion of the TFT substrate in the region AR1 shown in FIG. 1 in an enlarged manner.

In this embodiment, in forming the orientation film on the TFT substrate SUB1, for example, using an inkjet printing method or the like, a resin material ORI (orientation film material ink) in a liquid form is applied only on the display region DA and on a slight region around the display region DA and is baked. Here, the orientation film material ink ORI in a liquid form which is applied using the inkjet printing method, as indicated by a bold arrow in FIG. 7, spreads by wetting in the direction toward outside from the display region DA, that is, toward a sealing region SL shown in FIG. 1. Further, in a case of a conventional TFT substrate SUB1, in a region close to a gate side a of the TFT substrate SUB1, the orientation film material ink ORI in a liquid form easily spreads by wetting along the extending direction of the scanning signal lines GL and reaches a sealing region.

However, in this embodiment, due to the provision of the first orientation film outer periphery restricting portion Z1 formed on the TFT substrate SUB1, when the orientation film material ink ORI spreads by wetting in the direction toward the gate side a from the display region DA, the orientation film material ink ORI passes the recessed groove GV of the second insulation layer PAS2 and the transparent conductive film TE before reaching the sealing region SL. Here, the orientation film material ink ORI which reaches the recessed groove GV by spreading by wetting, as shown in an upper stage of FIG. 8, does not flow into the recessed groove GV initially and flows while obviating the recessed groove GV and hence, the flow of the orientation film material ink ORI can be controlled (along with a lapse of time, as shown in a lower stage of FIG. 8, ink falls into the inside of the recessed groove GV). Here, since the orientation film material ink ORI exhibits the poor wettability with the transparent conductive film TE, when the transparent conductive film TE preferably made of ITO is mounted on the surface of the recessed groove GV, spreading by wetting of the orientation film material ink ORI in a liquid form can be further suppressed by the recessed groove GV. Although one recessed groove GV may obtain a spreading preventing effect to some extent, it is desirable to provide a plurality of recessed grooves GV.

However, depending on a coating quantity, viscosity, coating atmosphere of the orientation film material ink ORI corresponding to a size of the liquid crystal display panel, there may be a case that the orientation film material ink ORI reaches the region SL in which the sealing material is arranged while getting over the first orientation film outer periphery restricting portion Z1. In this embodiment, as explained in conjunction with FIG. 3 and FIG. 4, due to the second orientation film outer periphery restricting portion Z2 which is formed in a portion close to the inside of the sealing region SL at the position away from the first orientation film outer periphery restricting portion Z1 in the scanning line terminal GLT direction, it is possible to prevent the orientation film material ink ORI which spreads by wetting while getting over the first orientation film outer periphery restricting portion Z1 from reaching the sealing region SL.

Figure 9:
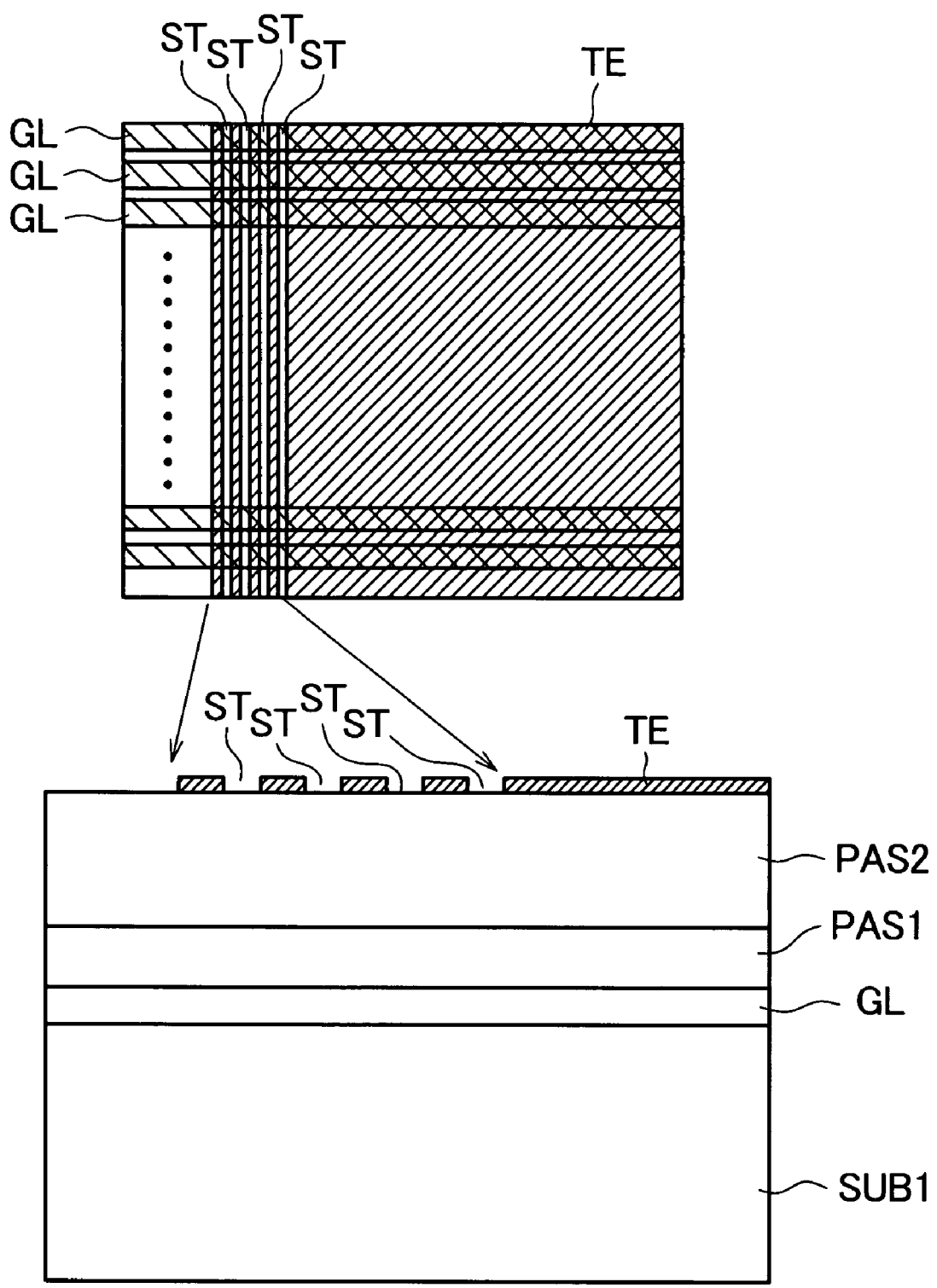
FIG. 9 is an explanatory view of a second orientation film outer periphery restricting portion.

FIG. 9 is explanatory views of the second orientation film outer periphery restricting portion Z2, wherein the upper stage of FIG. 9 is a plan view of the second orientation film outer periphery restricting portion Z2 and the lower stage of FIG. 9 is a cross-sectional view showing an essential part in FIG. 9A in an enlarged manner. The second orientation film outer periphery restricting portion Z2 is formed of a plurality of slits ST which are formed by linearly removing the transparent conductive film TE formed on the second insulation layer PAS2. Here, the transparent conductive film TE extends from the first orientation film outer periphery restricting portion Z1, and terminates on a sealing region SL side of the second orientation film outer periphery restricting portion Z2 and does not reach the sealing region SL. Although one slit ST may obtain a spreading preventing effect to some extent, it is desirable to provide a plurality of slits ST to surely prevent spreading by wetting of the orientation film material ink ORI.

Embodiment 2

Figure 10:
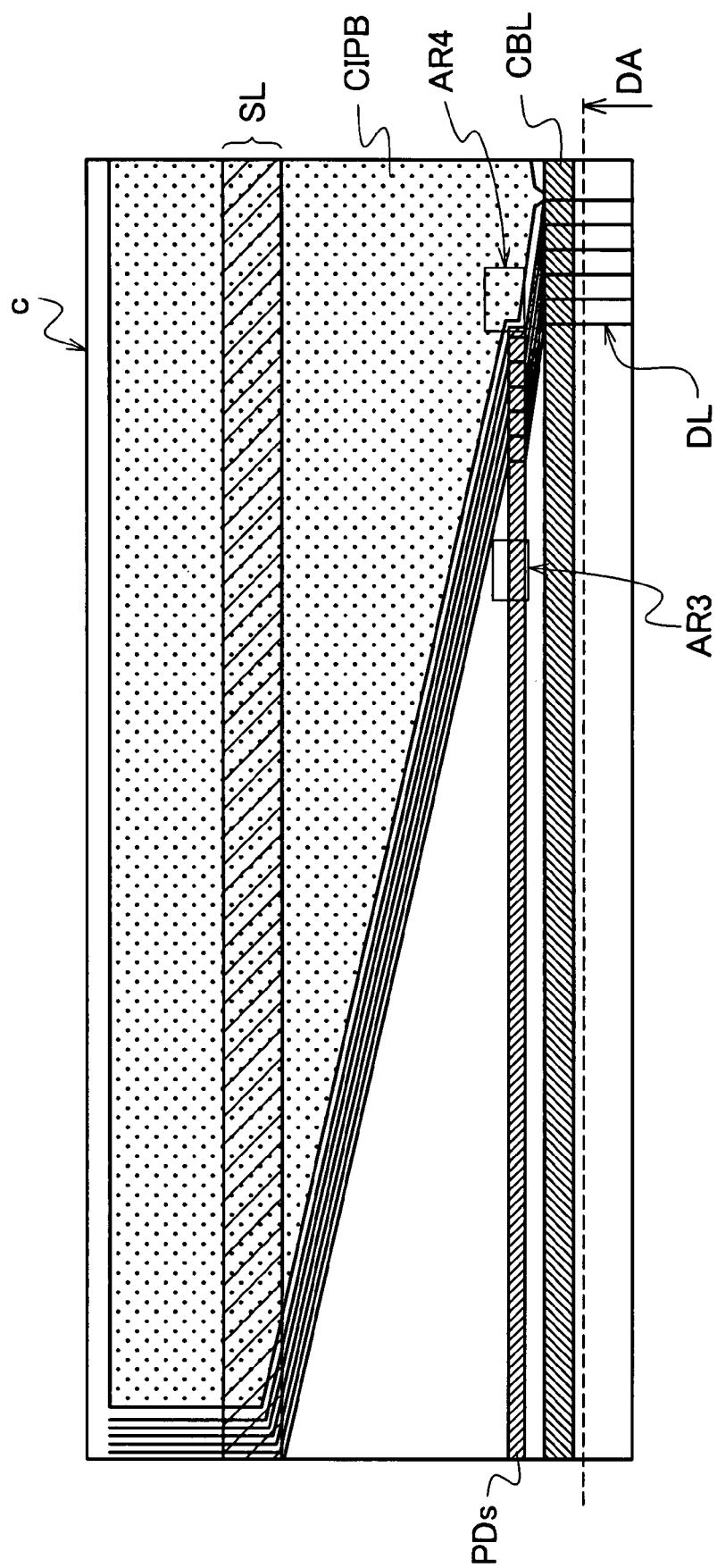
FIG. 10 is a plan view of an essential part of a drain side of a TFT substrate indicated by symbol AR2 in FIG. 1 which schematically shows the schematic constitution of a liquid crystal display panel of an embodiment 2 according to the present invention.
Figure 11:
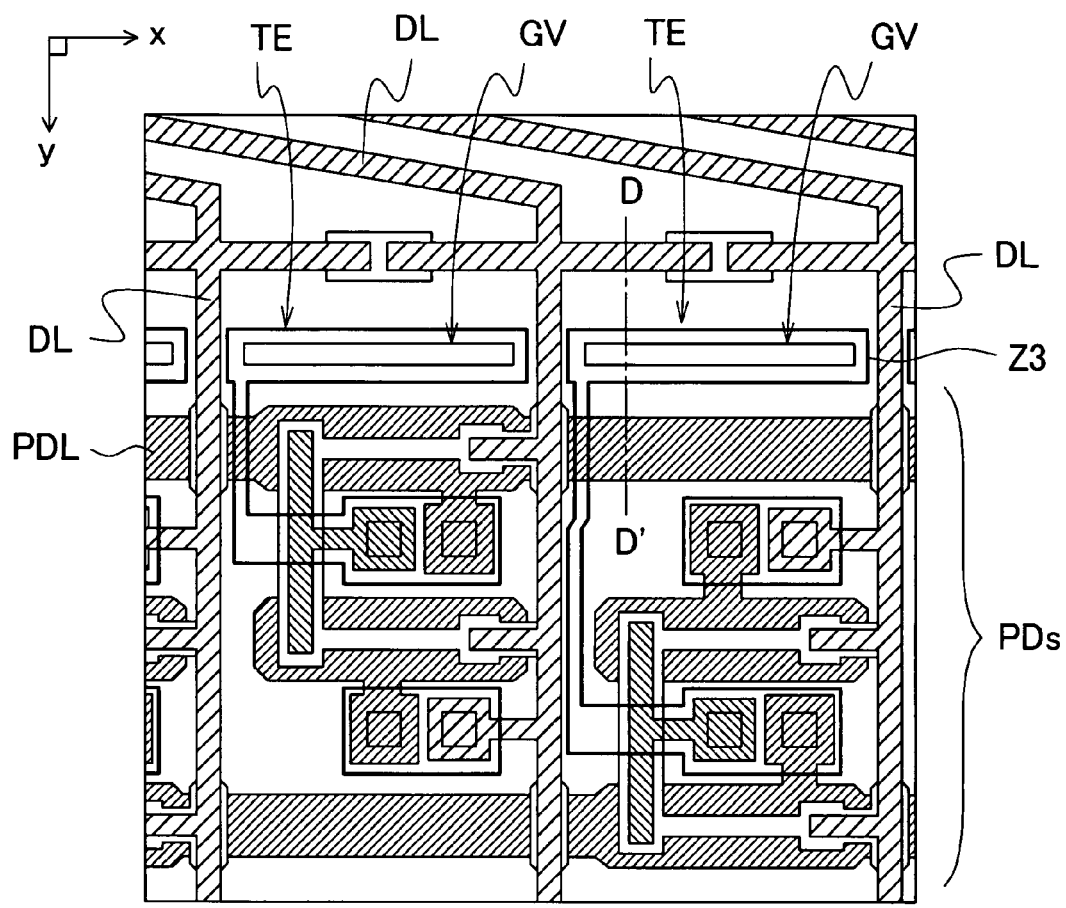
FIG. 11 is a schematic plan view showing the schematic constitution of a region AR3 shown in FIG. 10 in an enlarged manner.
Figure 12:
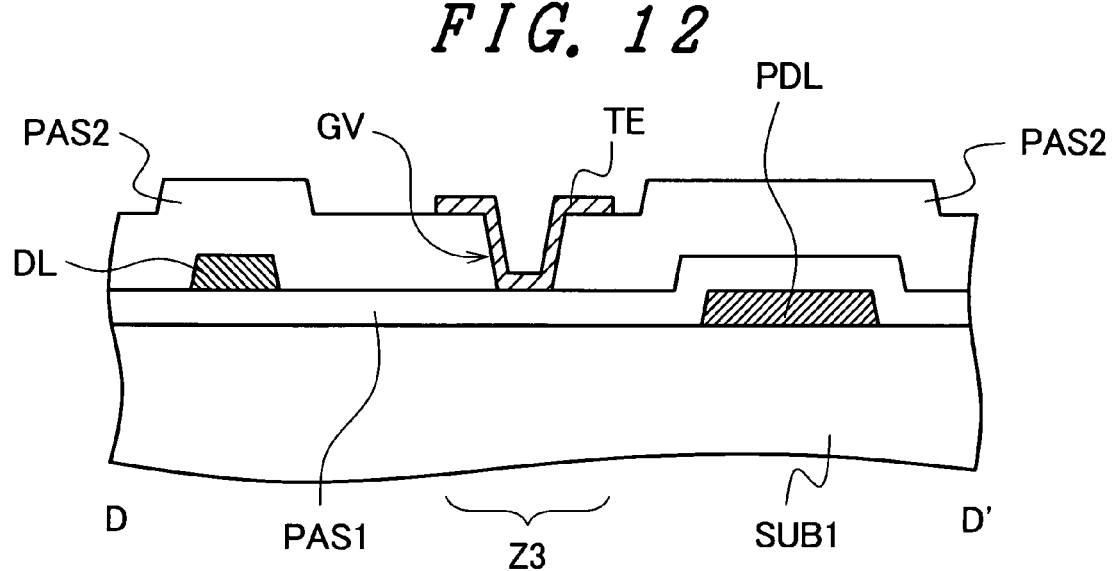
FIG. 12 is a schematic cross-sectional view taken along a line D-D' in FIG. 11.
Figure 13:
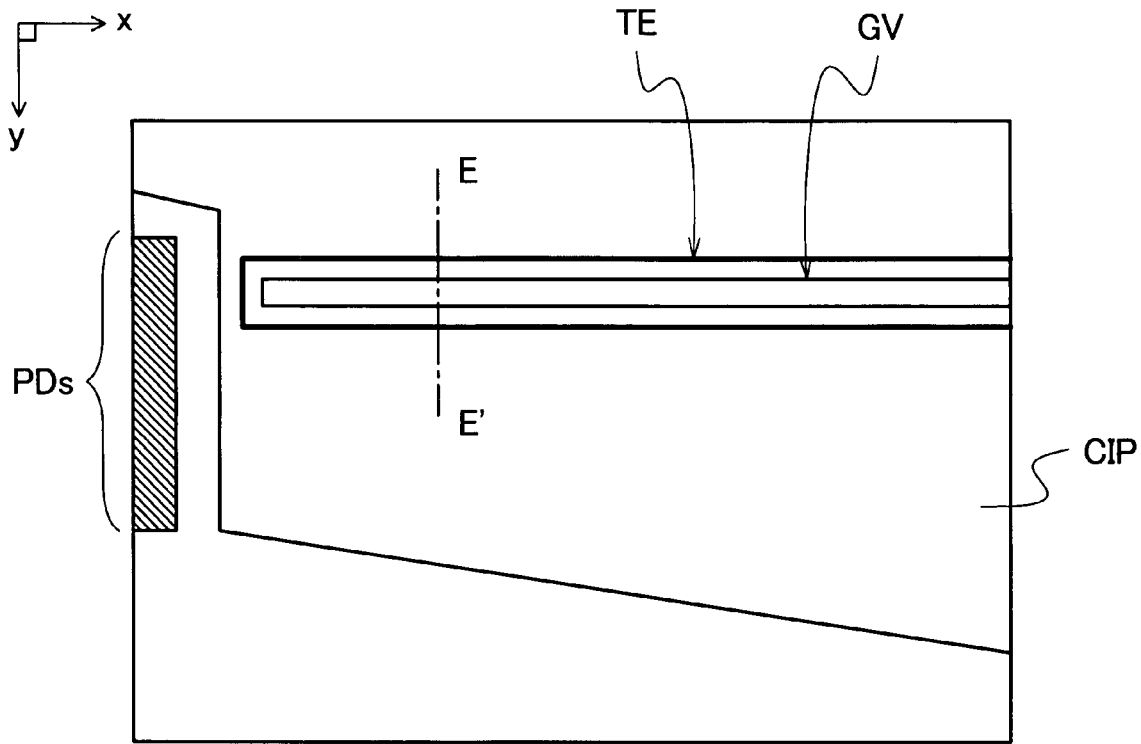
FIG. 13 is a schematic plan view showing the schematic constitution of a region AR4 shown in FIG. 10 in an enlarged manner.
Figure 14:
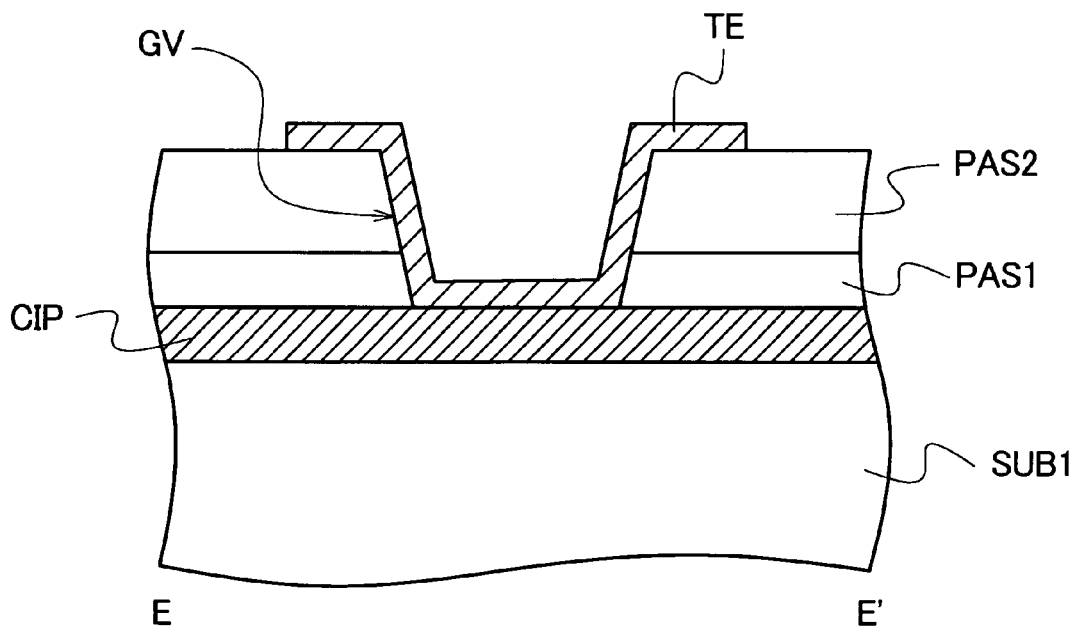
FIG. 14 is a schematic cross-sectional view taken along a line E-E' in FIG. 13.

FIG. 10 is a plan view of an essential part of a drain side of a TFT substrate indicated by symbol AR2 in FIG. 1 which schematically shows the schematic constitution of a liquid crystal display panel of an embodiment 2 according to the present invention. Further, FIG. 11 is a schematic plan view showing the schematic constitution of a region AR3 shown in FIG. 10 in an enlarged manner. FIG. 12 is a schematic cross-sectional view taken along a line D-D' in FIG. 11. FIG. 13 is a schematic plan view showing the schematic constitution of a region AR4 shown in FIG. 10 in an enlarged manner. FIG. 14 is a schematic cross-sectional view taken along a line E-E' in FIG. 13.

In the liquid crystal display panel of this embodiment, to observe an outer peripheral portion of the display region DA of the TFT substrate SUB1 close to the drain side c in an enlarged manner, as shown in FIG. 10, outside the display region DA, a common bus line CBL is formed along the outer periphery of the display region DA. Here, the common bus line CBL is simultaneously formed with the scanning signal lines GL, and the first insulation layer PAS1 is interposed between the common bus line CBL and the video signal lines DL.

Further, a region which is arranged outside the common bus line CBL as viewed from the display region DA and in which the video signal lines DL are collectively arranged, as shown in FIG. 10 to FIG. 12, includes a region PDs where protective diodes are formed. Here, in the region PDs where the protective diodes are formed, as shown in FIG. 11 and FIG. 12, a third orientation film outer periphery restricting portion Z3 which is constituted of the recessed grooves GV which are formed in a first insulation layer PAS1 and a second insulation layer PAS2 and the transparent conductive film TE which covers the recessed grooves GV is formed.

Further, on the drain side c of the liquid crystal display panel, for example, as shown in FIG. 10, a common input pattern CIPB for applying a common voltage to the common bus line CBL is formed. The common input pattern CIP is simultaneously formed with the scanning signal lines GL. In a region where the common input pattern CIP is formed, for example, as shown in FIG. 13 and FIG. 14, a groove portion which is constituted of a recessed groove GV which is formed in the second insulation layer PAS2 and the first insulation layer PAS1 and reaches the common input pattern CIP and the transparent conductive film TE which covers the recessed groove GV is formed.

Figure 15:
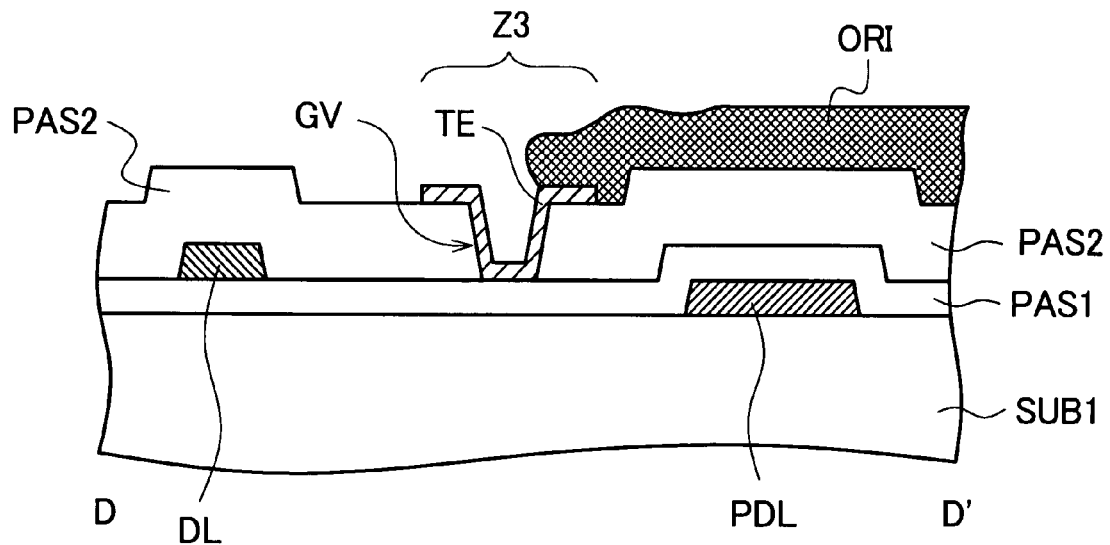
FIG. 15 is a schematic cross-sectional view for explaining a function of a third orientation film outer periphery restricting portion Z3 for suppressing a spreading of the orientation film material ink by wetting.

FIG. 15 is a schematic cross-sectional view for explaining a function of a third orientation film outer periphery restricting portion Z3 for suppressing a spreading by wetting of the orientation film material ink. Here, a common input pattern CIP also has a similar function of suppressing spreading by wetting of the orientation film material ink. FIG. 15 is a view as viewed on the same cross section as FIG. 12.

In forming the orientation film on the TFT substrate SUB1, for example, the orientation film material ink ORI in a liquid form is applied only to the display region DA and a slight region around a periphery thereof using an inkjet printing method. The applied orientation film material ink ORI spreads by wetting substantially isotropically in the direction toward the outside where the sealing region SL is arranged from the display region DA and, at the same time, the orientation resin material ink ORI also spreads by wetting in the direction toward the drain side c from the display region DA.

However, due to the provision of the groove portion which is constituted of the recessed groove GV which is formed in the third orientation film outer periphery restricting portion Z3 and the common input pattern CIP and the transparent conductive film TE which covers the recessed groove GV formed on the TFT substrate SUB1 of this embodiment, even when the orientation film material ink ORI spreads by wetting in the direction toward the drain side c from the display region DA, the orientation resin material ink ORI cannot flow into the recessed groove GV before reaching the sealing region SL and flows while avoiding the recessed groove as shown in FIG. 15 and hence, the flow of the orientation resin material ink ORI is suppressed. Further, since the orientation film material ink ORI in a liquid form exhibits poor wettability with the transparent conductive film TE and hence, the spreads by wetting of the orientation film material ink ORI can be further suppressed or prevented.

Figure 16:
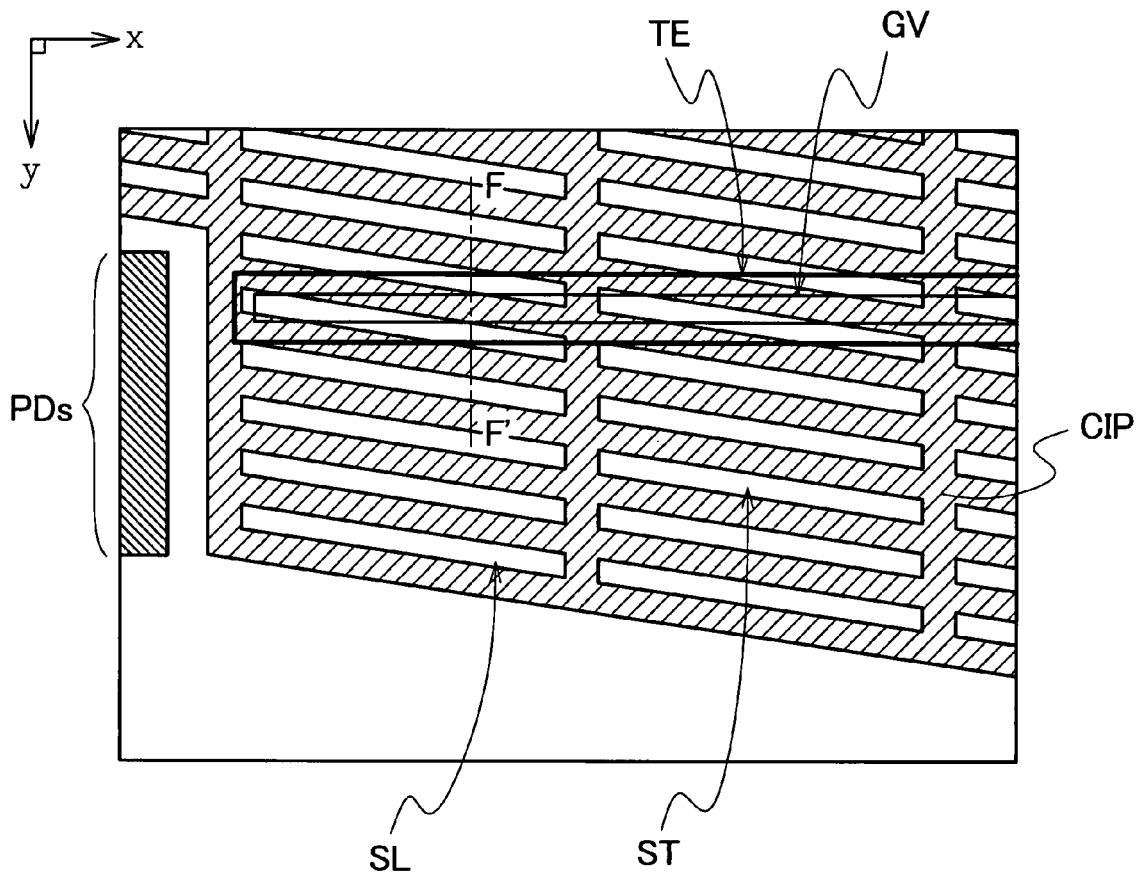
FIG. 16 is a schematic plan view for explaining a modification of a groove portion formed on the drain side of the TFT substrate.
Figure 17:
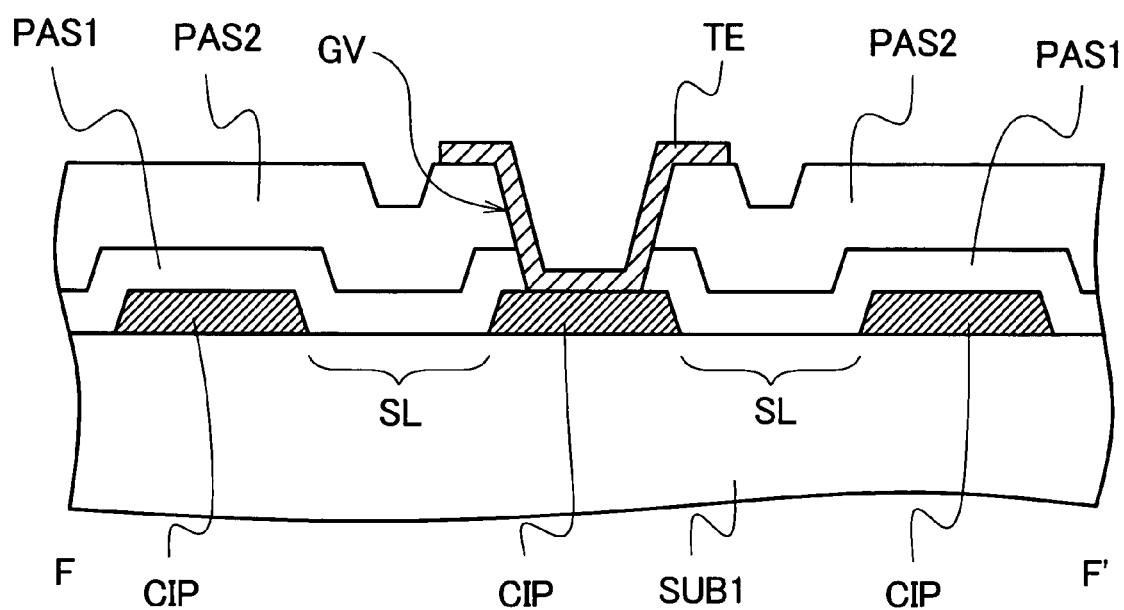
FIG. 17 is a schematic cross-sectional view taken along a line F-F' in FIG. 16.

FIG. 16 is a schematic plan view for explaining a modification of the groove portion formed on the drain side of the TFT substrate. FIG. 17 is a schematic cross-sectional view taken along a line F-F' in FIG. 16.

In the constitution shown in FIG. 13 and FIG. 14, the common input pattern CIP is a so-called matted pattern and hence, a surface of the second insulation layer PAS2 around the groove portion is flat. Accordingly, only with the provision of such groove portion, there exists a possibility that the spreading by wetting of the orientation resin material ink ORI in a liquid form cannot be stopped.

Accordingly, as shown in FIG. 16 and FIG. 17, it is preferable to form slits ST in the common input pattern CIP. By forming the slits ST in this manner, as shown in FIG. 17, a stepped portion is generated between a portion of the TFT substrate SUB1 where the common input pattern CIP is interposed and a portion of the TFT substrate SUB1 where the common input pattern CIP is not interposed thus suppressing the spreading by wetting of the orientation film material ink ORI.

Figure 18:
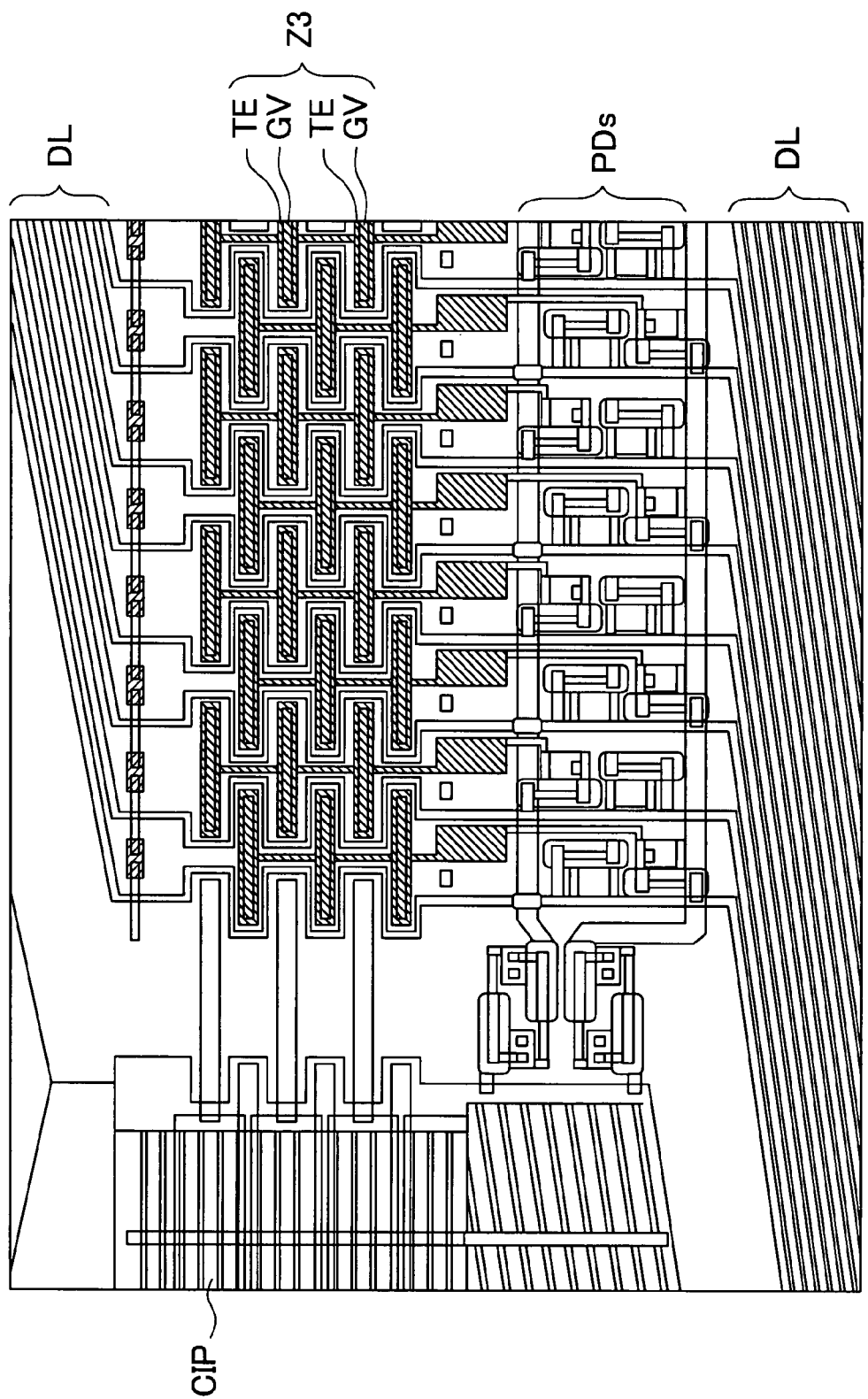
FIG. 18 is a plan view of an essential part of the drain side of the TFT substrate indicated by symbol AR3 in FIG. 10 in the same manner as FIG. 11 which explains the modification of the third orientation film outer periphery restricting portion Z3 formed on the liquid crystal display panel of the embodiment 2 according to the present invention.
Figure 19:
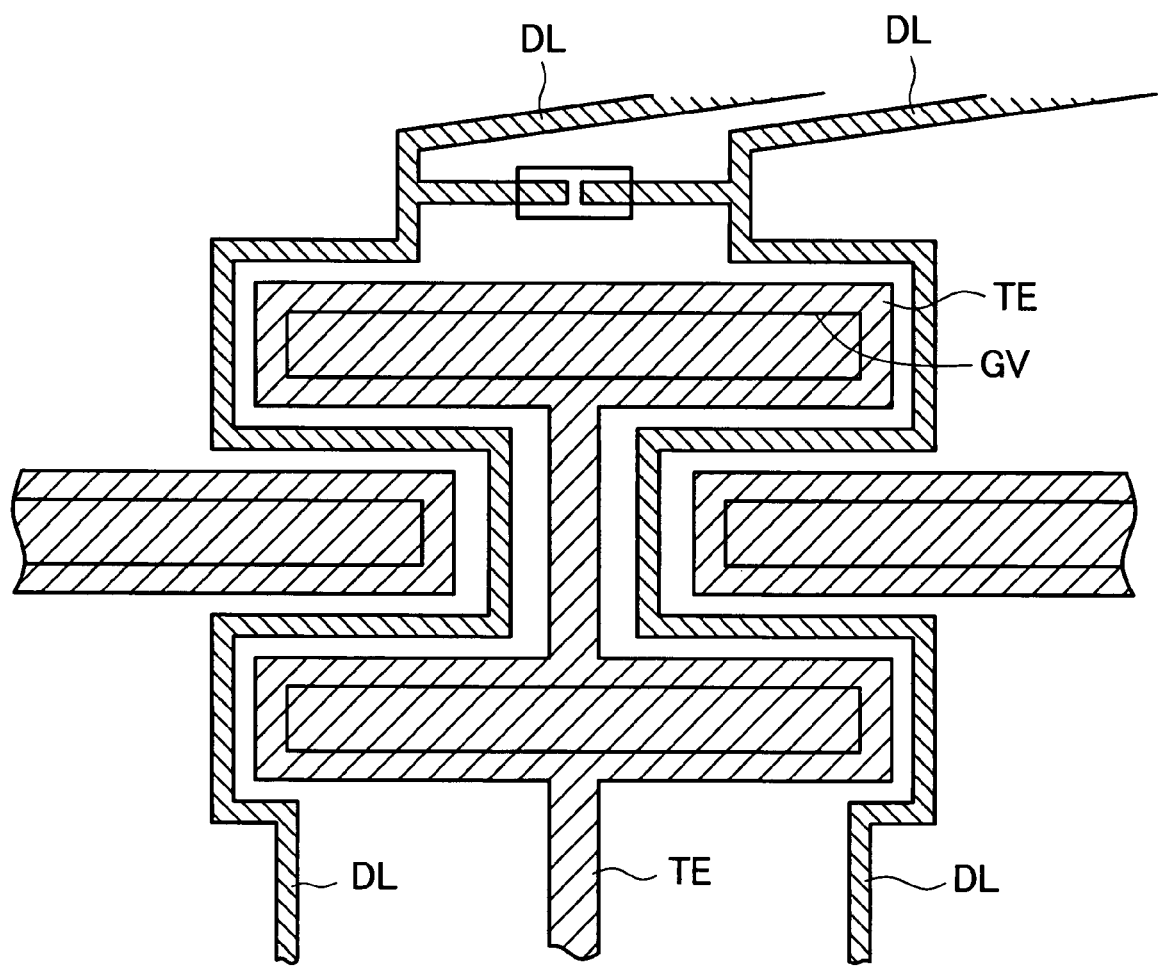
FIG. 19 is a partially enlarged view of a part of the third orientation film outer periphery restricting portion Z3 in FIG. 18.

FIG. 18 is a plan view of an essential part of the drain side of the TFT substrate indicated by symbol AR3 in FIG. 10 in the same manner as FIG. 11 which explains the modification of the third orientation film outer periphery restricting portion Z3 formed on the liquid crystal display panel of the embodiment 2 according to the present invention. FIG. 19 is a partially enlarged view of a part of the third orientation film outer periphery restricting portion Z3 in FIG. 18.

In such a constitution, between the display region on which the plurality of video signal lines DL are formed and the region where the sealing agent is arranged, a protective diode forming region PDs which connects a plurality of respective video signal lines using a diode circuit with each other is formed. Then, between the sealing region side of the plurality of video signal lines DL and the protective diode forming region PDs, the third orientation film outer periphery restricting portion Z3 where the plurality of recessed grooves GV and the transparent conductive film TE extend on the inner surface and the bottom surface of the recessed groove GV is formed.

In such a constitution, the plurality of recessed grooves GV which constitutes the third orientation film outer periphery restricting portion Z3 is arranged in a portion elongated in the direction parallel to an outer periphery of the display region DA and, is arranged in a staggered manner to engage with each other. Then, the video signal lines DL which traverse the third orientation film outer periphery restricting portion Z3 are arranged in a zigzag manner through spaces defined between the plurality of recessed grooves GV which are arranged in the staggered manner. The transparent conductive film TE is made of the same conductive material such as ITO. The transparent conductive film TE is connected to the common input pattern CIP by connecting the plurality of recessed grooves GV with each other. By providing the recessed grooves GV in multi stages as described above, it is possible to surely suppress spreading by wetting of the orientation film material ink ORI.

Figure 20:
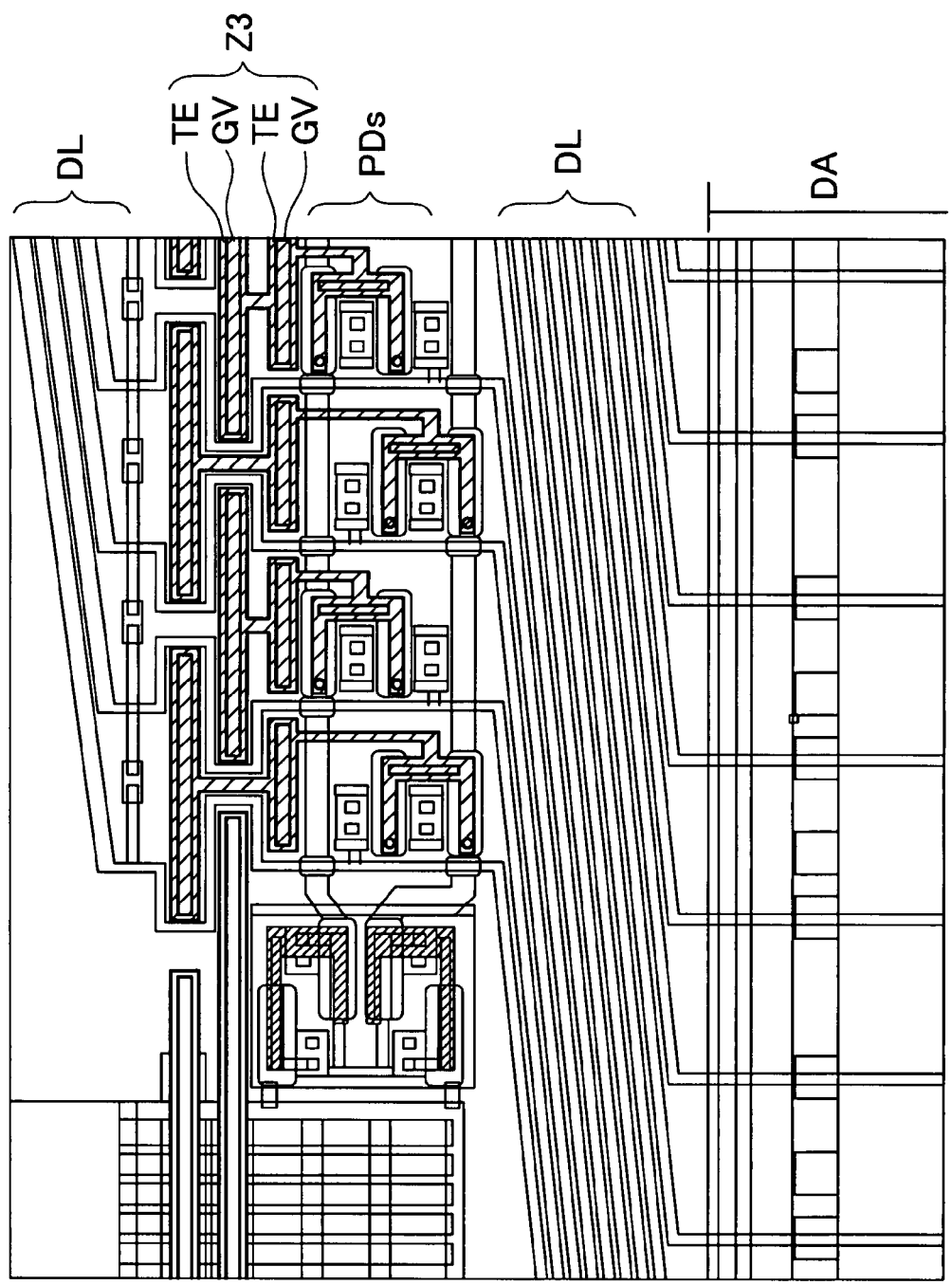
FIG. 20 is a plan view of an essential part of the drain side of the TFT substrate indicated by symbol AR3 in FIG. 10 in the same manner as FIG. 18 which explains another modification of the third orientation film outer periphery restricting portion Z3 formed on the liquid crystal display panel of the embodiment 2 according to the present invention.
Figure 21:
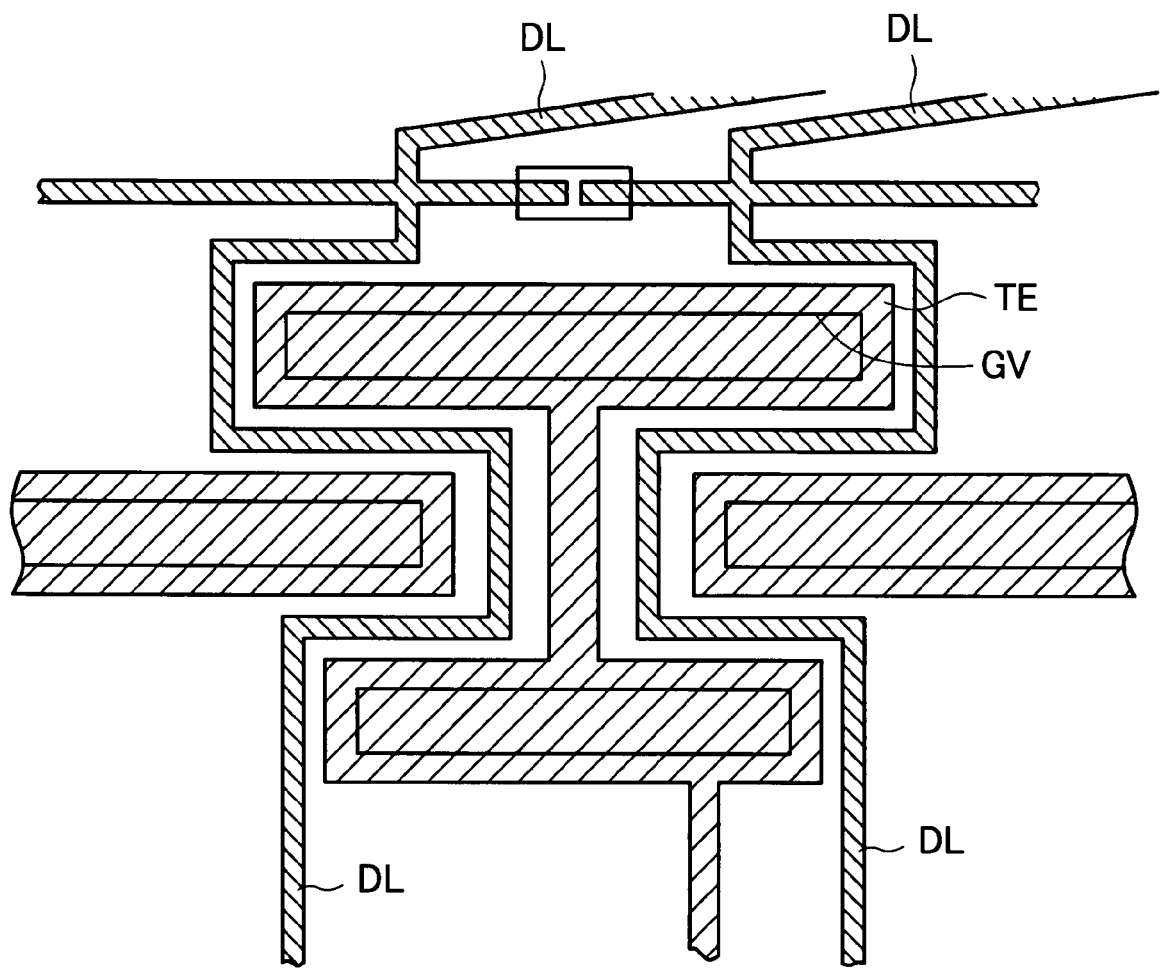
FIG. 21 is a partially enlarged view of a part of the third orientation film outer periphery restricting portion Z3 in FIG. 20.

FIG. 20 is a plan view of an essential part of the drain side of the TFT substrate indicated by symbol AR3 in FIG. 10 in the same manner as FIG. 18 which explains another modification of the third orientation film outer periphery restricting portion Z3 formed on the liquid crystal display panel of the embodiment 2 according to the present invention. FIG. 21 is a partially enlarged view of a part of the third orientation film outer periphery restricting portion Z3 in FIG. 20.

Also in the constitution of this modification, between the display region on which the plurality of video signal lines DL are formed and the region where the sealing agent is arranged, a protective diode forming region PDs which connects a plurality of respective video signal lines using a diode circuit with each other is formed. Then, between the sealing region side of the plurality of video signal lines DL and the protective diode forming region PDs, the third orientation film outer periphery restricting portion Z3 where the plurality of recessed grooves GV and the transparent conductive film TE extend on the inner surface and the bottom surface of the recessed groove GV is formed.

In such a constitution, the plurality of recessed grooves GV which constitutes the third orientation film outer periphery restricting portion Z3 is arranged in a portion elongated in the direction parallel to an outer periphery of the display region DA and, is arranged to engage with each other. At the same time, the recessed grooves GV are formed with a small length in the protective diode forming region PDs and a large length in the sealing region side. Then, the video signal lines DL which traverse the third orientation film outer periphery restricting portion Z3 are arranged in a zigzag manner through spaces defined between the plurality of recessed grooves GV. The transparent conductive film TE is made of the same conductive material such as ITO. The transparent conductive film TE is connected to the common input pattern CIP by connecting the plurality of recessed grooves GV with each other.

With the constitution of the third orientation film outer periphery restricting portion Z3 shown in FIG. 20 and FIG. 21, even when the number of stages of recessed grooves GV is small, the recessed groove GV which is formed with a large length on the sealing region side can surely suppress the spreading by wetting of the orientation film material ink ORI.

Figure 22:
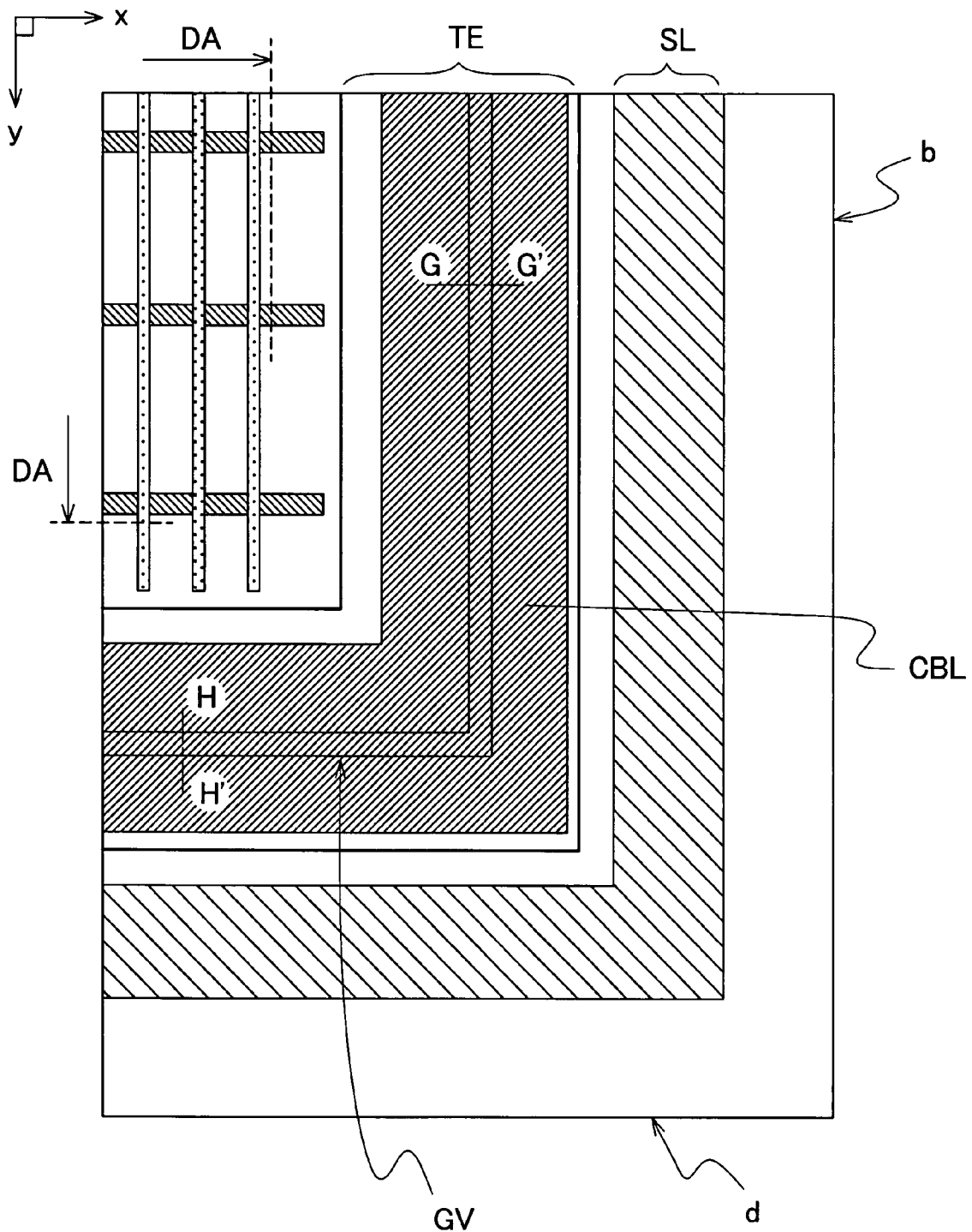
FIG. 22 is a schematic plan view showing the schematic constitution of the TFT substrate in a region AR5 shown in FIG. 1 in an enlarged manner.
Figure 23:
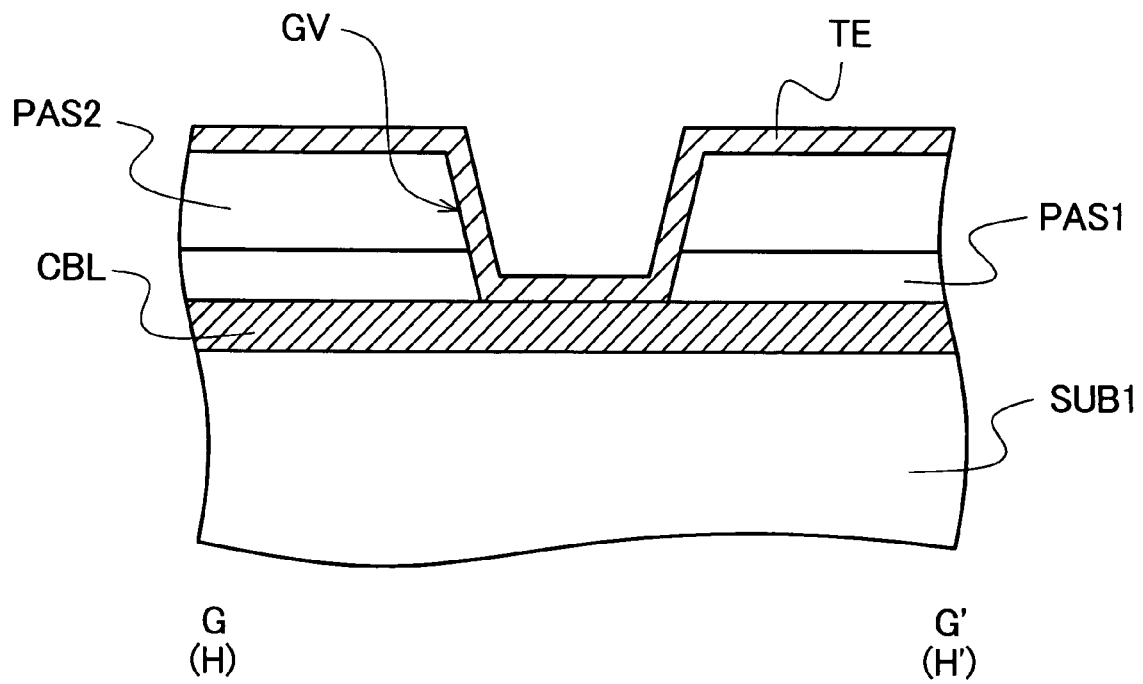
FIG. 23 is a schematic cross-sectional view taken along a line G-G' and a line H-H' in FIG. 22 respectively.

FIG. 22 is a schematic plan view showing the schematic constitution of the TFT substrate in a region AR5 shown in FIG. 1 in an enlarged manner. FIG. 23 is a schematic cross-sectional view taken along a line G-G' and a line H-H' in FIG. 22 respectively.

The explanation heretofore is made with respect to the method for controlling the spreading by wetting of the orientation resin material ink ORI in the vicinity of the gate side a and the drain side c of the TFT substrate SUB1. The present invention is not limited to the control of spreading by wetting of the orientation film material ink ORI in the vicinity of the gate side "a" and the drain side "c" of the TFT substrate SUB1 and is also applicable to the control of spreading by wetting of the orientation film material ink ORI in the vicinity of the other side of the TFT substrate SUB1. Hereinafter, a method for controlling spreading by wetting of the orientation resin material ink ORI in the vicinity of an opposite gate side "b" and opposite drain side "d" of the TFT substrate SUB1 is explained.

At a corner portion where the opposite gate side "b" and the opposite drain side c abut each other in the TFT substrate SUB1, for example, as shown in FIG. 22, a common bus line CBL is arranged outside the display region DA along the outer periphery of the display region DA. The common bus line CBL is formed simultaneously with the scanning signal lines GL and, as shown in FIG. 23, is arranged between the TFT substrate SUB1 and the first insulation layer PAS1.

Further, on a portion of the common bus line CBL along the opposite gate side b, an elongated groove portion which extends in the direction along the opposite gate side b is formed. On a portion of the common bus line CBL along the opposite drain sided, an elongated groove portion which extends in the direction along the opposite drain side d is formed. These two groove portions are continuously formed at the corner portion of the common bus line CBL.

Further, the groove portions formed along the opposite gate side b and the opposite drain side d are, for example, as shown in FIG. 23, respectively constituted of a recessed groove GV which is formed in the first insulation layer PAS1 and the second insulation layer PAS2 which are stacked on the common bus line CBL and the transparent conductive film TE which covers the recessed groove GV. Here, it is preferable to set a length of the recessed groove GV in the direction along the opposite gate side b to a value larger than a distance between two scanning signal lines which are arranged at outermost sides out of the plurality of scanning signal lines. In the same manner, it is preferable to set a length of the recessed groove GV in the direction along the opposite drain side d to a value larger than a distance between two video signal lines which are arranged at outermost sides out of the plurality of video signal lines. Here, the transparent electrode TE is, for example, as shown in FIG. 22, formed such that the transparent conductive film TE covers the whole common bus line CBL in a plan view.

Due to such a constitution, also when the applied orientation resin material ink ORI in a liquid form spreads by wetting in the direction toward the opposite gate side b and the opposite drain side d from the display region DA, before reaching the sealing region SL, the orientation film material ink ORI in a liquid form passes the groove portion constituted of the recessed groove GV formed in the second insulation layer PAS2 and the first insulation layer PAS1 and the transparent conductive film TE. Accordingly, the orientation film material ink ORI which spreads by wetting and reaches the groove portion cannot flow into the recessed groove GV thus flowing along the recessed groove GV. Further, the orientation film material ink ORI in a liquid form exhibits low wettability to the transparent conductive film TE and hence, by forming the transparent conductive film TE made of ITO on the surface of the groove portion, the spreading by wetting of the orientation film material ink ORI can be suppressed by the groove portion.

Further, in the constitutional example shown in FIG. 22, one groove portion is formed. However, it is needless to say that the constitution of the groove portion is not limited to such a case and double groove portions or triple groove portions may be formed toward the sealing region SL from the display region DA.

Figure 24:
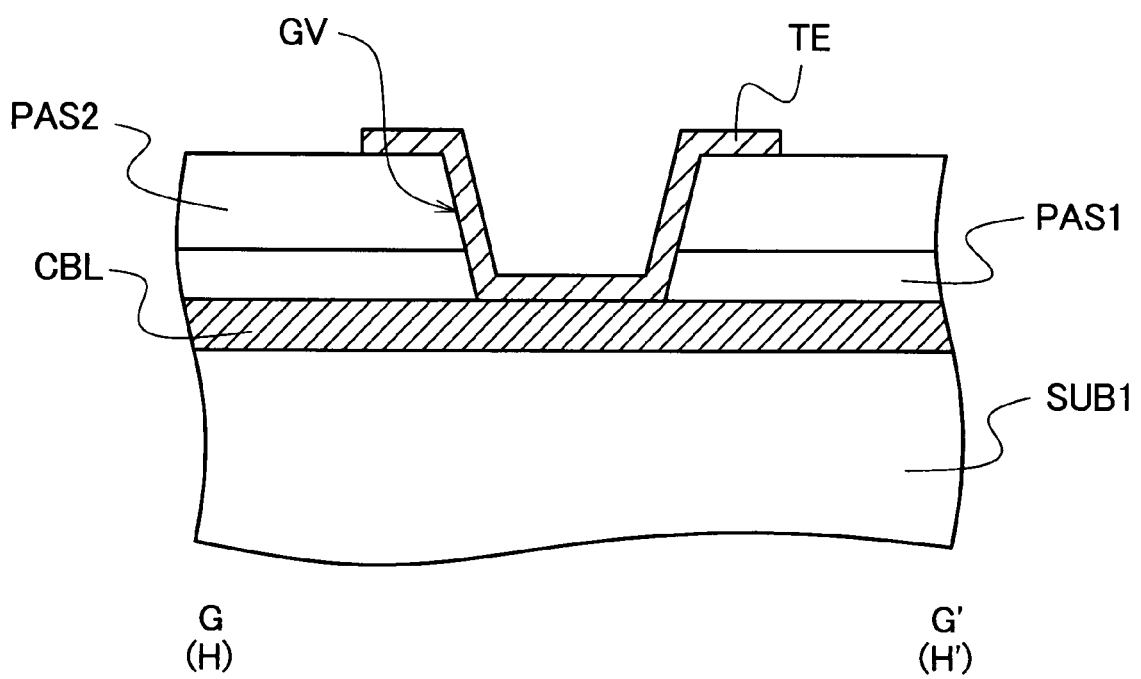
FIG. 24 is a schematic cross-sectional view for explaining another modification of the groove portions formed in the opposite gate side and the opposite drain side of the TFT substrate.
Figure 25:
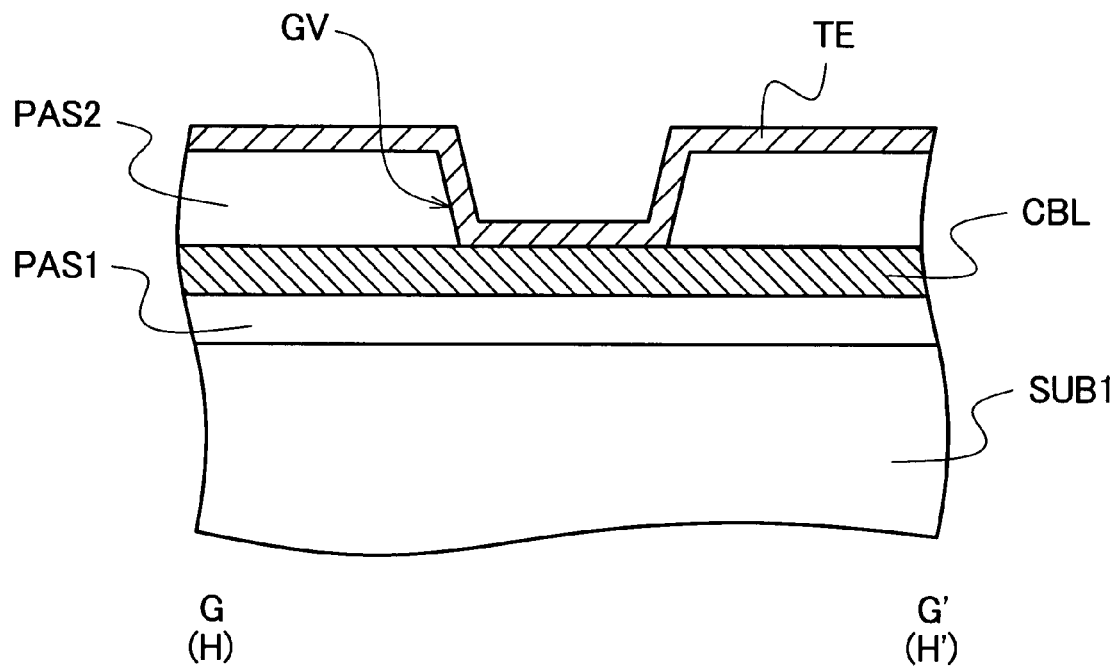
FIG. 25 is a schematic cross-sectional view for explaining still another modification of the groove portions formed in the opposite gate side and the opposite drain side of the TFT substrate.
Figure 26:
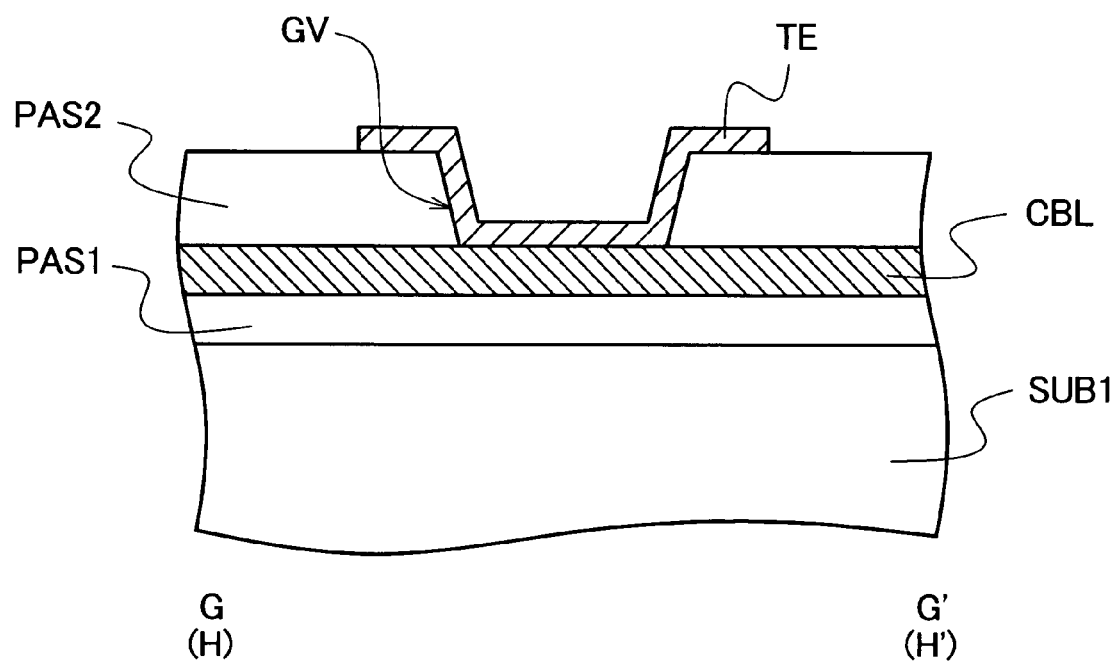
FIG. 26 is a schematic cross-sectional view for explaining still another modification of the groove portions formed in the opposite gate side and the opposite drain side of the TFT substrate.

FIG. 24 is a schematic cross-sectional view for explaining another modification of the groove portions formed in the opposite gate side and the opposite drain side of the TFT substrate. FIG. 25 is a schematic cross-sectional view for explaining still another modification of the groove portions formed in the opposite gate side and the opposite drain side of the TFT substrate. FIG. 26 is a schematic cross-sectional view for explaining still another modification of the groove portions formed in the opposite gate side and the opposite drain side of the TFT substrate.

In FIG. 22 and FIG. 23, a case in which the transparent conductive film TE is formed such that the transparent electrode TE covers whole common bus line CBL in a plan view is exemplified. However, it is needless to say that the constitution of the transparent electrode is not limited to such a case and, for example, as shown in FIG. 24, the transparent conductive film TE may be formed only on and around the recessed groove GV which is formed in the first insulation layer PAS1 and the second insulation layer PAS2.

Further, in FIG. 22 and FIG. 23, a case in which the common bus line CBL is formed simultaneously with the formation of the scanning signal lines GL is exemplified. However, it is needless to say that the common bus line CBL may be formed simultaneously with the formation of the video signal lines DL. In such a case, the groove portion is, for example, as shown in FIG. 25, constituted of a recessed groove GV which is formed in the second insulation layer PAS2 and the transparent conductive film TE which is formed on the surface of the second insulation layer PAS2. Further, for example, as shown in FIG. 26, the transparent conductive film TE may be formed only on and around the recessed groove GV.

As has been explained heretofore, according to the embodiment, in the TFT substrate SUB1, in the substantially annular region which is arranged inside the sealing region SL and outside the display region DA, the groove portion which is constituted of the recessed grooves GV formed in the insulation layer and the transparent conductive film TE which extends along the side surfaces and the bottom surfaces of the inside of the recessed grooves GV is formed. Accordingly, in forming the orientation film of the liquid crystal display panel, it is possible to suppress the spreading by wetting of the orientation film material ink ORI outside the display region and, at the same time, by suppressing unnecessary spreading by wetting, it is possible to maintain the uniformity of the film thickness of the orientation film in the inside of the display region.

Figure 27:
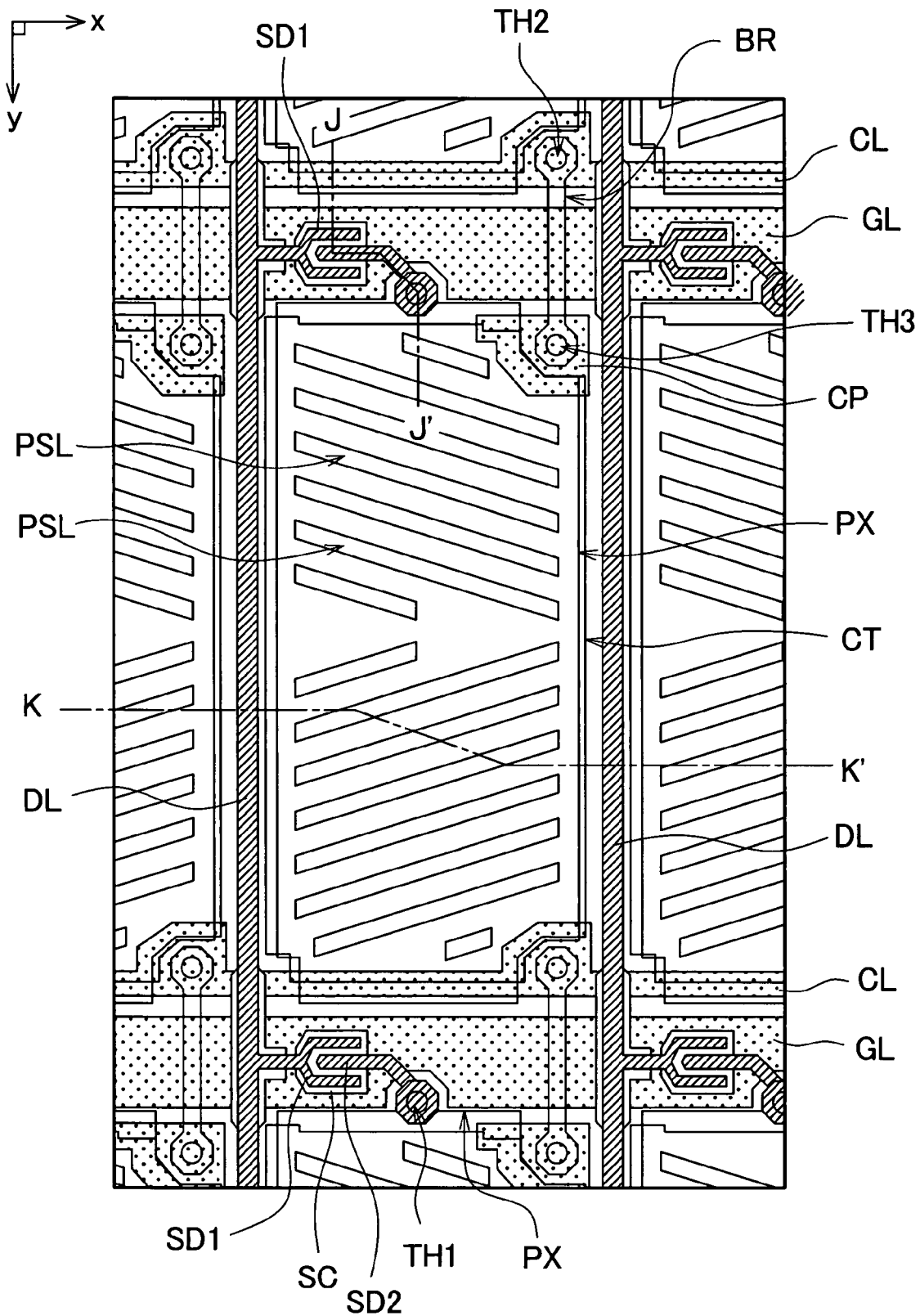
FIG. 27 is a schematic plan view showing one constitutional example of one pixel of the display region of the TFT substrate as viewed from a viewer's side.
Figure 28:
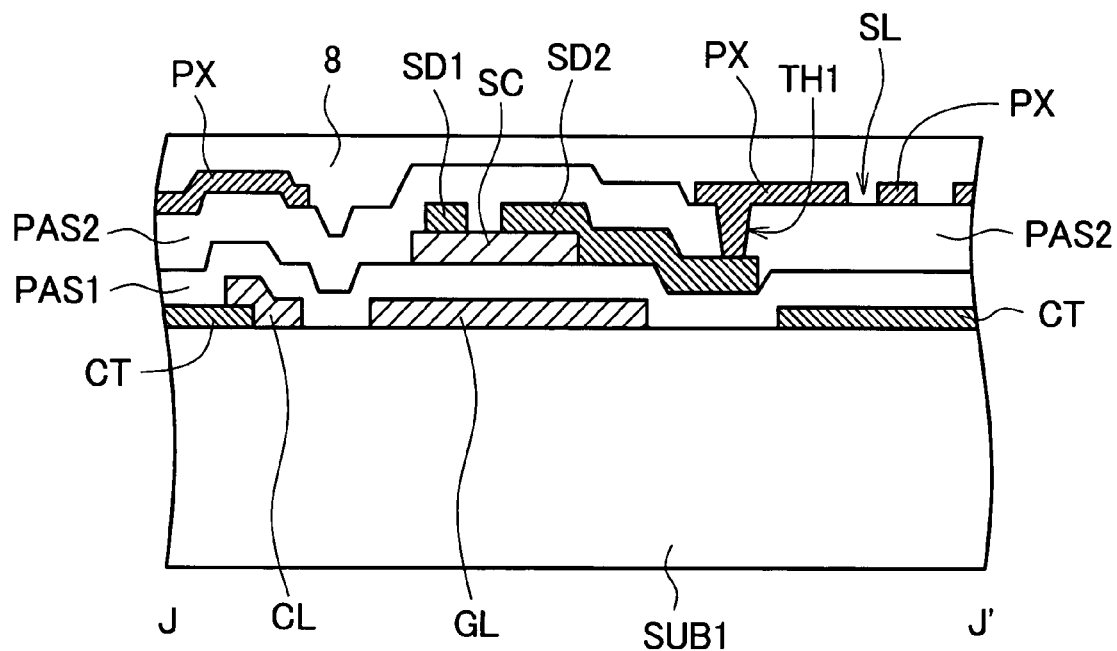
FIG. 28 is a schematic cross-sectional view taken along a line J-J' in FIG. 27.
Figure 29:
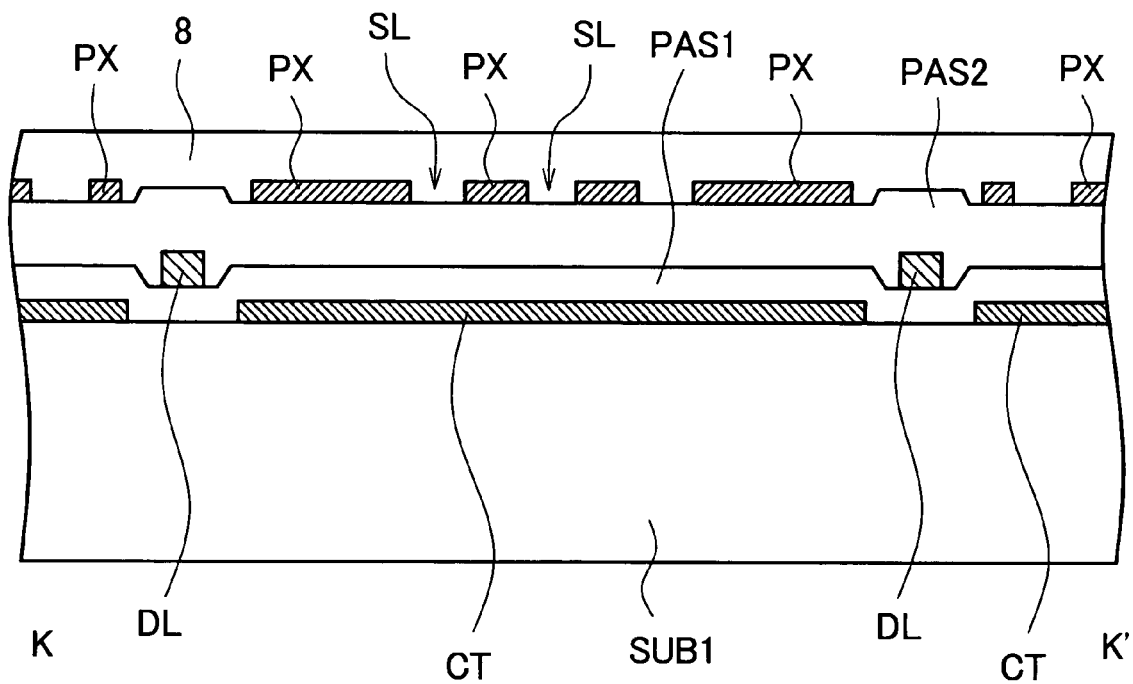
FIG. 29 is a schematic cross-sectional view taken along a line K-K' in FIG. 27.

FIG. 27 to FIG. 29 are schematic views showing one constitutional example of one pixel which is formed in the display region of the liquid crystal display panel of this embodiment. FIG. 27 is a schematic plan view showing one constitutional example of one pixel of the display region of the TFT substrate as viewed from a viewer's side. FIG. 28 is a schematic cross-sectional view taken along a line J-J' in FIG. 27. FIG. 29 is a schematic cross-sectional view taken along a line K-K' in FIG. 27.

When the liquid crystal display panel of this embodiment adopts a lateral electric field driving method which is referred to as an IPS method, the pixel electrodes PX and the counter electrodes CT are formed on the TFT substrate SUB1. Further, the IPS method is classified into, for example, a method in which the pixel electrodes PX and the counter electrodes CT having a comb-teeth shape in a plan view are arranged on the same layer, that is, on the same insulation layer and a method in which the pixel electrodes PX and the counter electrodes CT are arranged on a surface of the substrate in parallel to each other by way of an insulation layer. Out of these methods, in case of the IPS method which arranges the pixel electrodes and the counter electrodes in parallel to each other by way of the insulation layer, one pixel of the TFT substrate is, for example, constituted in the same manner as the constitution shown in FIG. 27 to FIG. 29.

In FIG. 27 to FIG. 29, on the surface of the TFT substrate SUB1 preferably made of glass, a plurality of scanning signal lines GL which extends in the x direction, common signal lines CL which are arranged in parallel to the respective scanning signal lines GL and counter electrodes CT which are connected to the common signal lines CL are formed. Here, the respective common signal lines CL are, for example, as shown in FIG. 5, connected to the common bus line CBL outside the display region DA. Further, on a side opposite to the direction along which the common signal lines CL are arranged as viewed from the scanning signal lines GL, common connection pads CP which are connected to the counter electrodes CT are formed.

Then, on the scanning signal lines GL, the counter electrodes CT and the like, the semiconductor layers SC, the video signal lines DL, the drain electrodes SD1, and the source electrodes SD2 are formed by way of the first insulation layer PAS1. Here, the semiconductor layers SC are made of amorphous silicon (a-Si), for example. The semiconductor layers SC include, besides semiconductor layers SC which function as channel layers of the TFT elements, for example, semiconductor layers SC which prevent short-circuiting between the scanning signal lines GL and the video signal lines DL at portions where the scanning signal lines GL and the video signal lines DL three-dimensionally intersect with each other. Further, in this case, the semiconductor layers SC which function as channel layers of the TFT are formed on the scanning signal lines GL by way of the first insulation layer PAS1, and the first insulation layer PAS1 which is interposed between the scanning signal lines GL and the semiconductor layers SC functions as a gate insulation film of the TFT.

Further, the video signal lines DL are signal lines which extend in the y direction and portions of the video signal lines DL are bifurcated and are formed on the semiconductor layer SC which functions as channel layers of the TFT. The portions which are bifurcated from the video signal lines DL constitute the drain electrodes SD1.

On the semiconductor layers SC, the video signal lines DL and the like, the pixel electrodes PX and bridge lines BR are formed by way of a second insulation layer PAS2. The pixel electrodes PX are electrically connected with the source electrodes SD2 via through holes TH3. Further, the pixel electrode PX forms a plurality of slits (opening portions) PSL in a region thereof which overlaps the counter electrode CT in a plan view.

Further, the bridge line BR is a line which electrically connects two counter electrodes CT which are arranged with one scanning signal line GL therebetween. The bridge line BR is electrically connected with a common signal line CL and a common connection pad CP which are arranged with the scanning signal line GL sandwiched therebetween via through holes TH4, TH5.

Here, it is needless to say that the TFT substrate SUB1 in the liquid crystal display panel according to the present invention is not limited to the case in which one pixel has the particular constitution and is applicable to the TFT substrates having various constitutions known in general conventionally.

Although the present invention has been explained specifically in conjunction with the best mode for carrying out the invention, the present invention is not limited to any one of the above-mentioned embodiments and various modifications are conceivable without departing from the technical concept of the present invention.

For example, in this embodiment, the explanation is made with respect to an example which provides the groove portion which suppresses the spreading by wetting of the orientation film material ink on the TFT substrate SUB1 of the liquid crystal display panel. However, the present invention is not limited to the TFT substrate and is also applicable to a formation of the orientation film of the counter substrate.

When the liquid crystal display panel adopts the vertical electric field drive method such as the TN method or the VA method, a counter electrode CT is formed on the counter substrate. In this case, a black matrix (light blocking pattern) and color filters are formed on a surface of a glass substrate, and the counter electrode is formed on these black matrix and the color filters by way of an overcoat layer, for example. Accordingly, by forming the groove portion in such a manner that recessed grooves which are formed in the overcoat layer are formed in a region inside a region where the sealing material is arranged and outside the display region in forming the overcoat layer and the counter electrode extends on surfaces of the recessed grooves, it is possible to prevent the spreading by wetting of the orientation film by the groove portion.

What is claimed is:

1. A liquid crystal display device having a display panel in which an annular sealing material is arranged between a pair of substrates, a liquid crystal material is sealed in a space surrounded by the pair of substrates and the sealing material, a display region is formed in the inside of a region surrounded by the sealing material in a plan view, and signal lines which extend to the outside of the sealing material from the inside of the display region is formed on one of the substrates, wherein
   the pair of substrates have orientation films on surfaces thereof which face opposing substrates,
   the substrate on which the signal lines are formed, on a side thereof which is disposed between a region on which the sealing material is arranged and the display region and along which the signal lines extend to the outside of the sealing material from the display region, includes a first conductive layer, a second conductive layer and an insulation layer which is interposed between the first and second conductive layers between the orientation film and the substrate,
   the insulation layer extends in the direction at least along an outer periphery of the display region, and includes a groove portion having a recessed groove which opens on the orientation film side,
   the first conductive layer is made of ITO and covers a surface of a liquid crystal layer side of the recessed groove, the first conductive layer on the groove portion having a recessed groove form along the recessed groove,
   the substrate which includes the groove portion includes a pixel electrode made of ITO in each pixel region, and
   the signal lines are formed in a state that the signal lines go around the recessed groove.

2. A liquid crystal display device according to claim 1, wherein the signal lines are either one of scanning signal lines or video signal lines.

3. A liquid crystal display device according to claim 1, wherein the substrate which includes the groove portion includes a plurality of scanning signal lines, a plurality of video signal lines which three-dimensionally intersects the plurality of scanning signal lines, and a TFT element and the pixel electrode which are arranged in each pixel region surrounded by two neighboring scanning signal lines and two neighboring video signal lines.

4. A liquid crystal display device according to claim 1, wherein the second conductive layer forms a portion of a protective diode, and
   a region in which the protective diode is formed is formed along the display region between a region on which the sealing material is arranged and the display region.

5. A liquid crystal display device according to claim 4, wherein the protective diode is formed between the signal line which extends in the inside of the display region and the signal line which extends to the outside of the sealing material.

6. A liquid crystal display device according to claim 5, wherein the recessed groove is formed between the protective diode and the sealing material.

7. A liquid crystal display device according to claim 5, wherein the recessed groove is formed in at least two or more rows per one signal line.

8. A liquid crystal display device according to claim 6, wherein the plurality of recessed grooves formed in the substrate has the same size.

9. A liquid crystal display device according to claim 6, wherein the plurality of recessed grooves formed in the substrate is formed such that the closer to the sealing material, a size of the recessed groove is increased.

10. A liquid crystal display device according to claim 1, wherein the recessed grooves have portions which are elongated in the direction parallel to the outer periphery of the display region, and are arranged in a staggered pattern to be engaged with each other.

11. A liquid crystal display device according to claim 10, wherein the signal lines are arranged in a zigzag manner passing between the plurality of recessed grooves arranged in a staggered pattern.

12. A liquid crystal display device according to claim 10, wherein the orientation films are applied by ink-jet.

* * * * *